United States Patent
Cholas et al.

(10) Patent No.: US 9,743,142 B2
(45) Date of Patent: Aug. 22, 2017

(54) MULTI-STREAM PREMISES APPARATUS AND METHODS FOR USE IN A CONTENT DELIVERY NETWORK

(75) Inventors: Chris Cholas, Frederick, CO (US); William L. Helms, Longmont, CO (US); George W. Sarosi, Charlotte, NC (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 986 days.

(21) Appl. No.: 12/070,560

(22) Filed: Feb. 19, 2008

(65) Prior Publication Data

US 2009/0210912 A1    Aug. 20, 2009

(51) Int. Cl.

| | |
|---|---|
| H04N 7/173 | (2011.01) |
| H04N 7/18 | (2006.01) |
| H04N 21/472 | (2011.01) |
| H04N 5/44 | (2011.01) |
| H04N 5/50 | (2006.01) |
| H04N 21/426 | (2011.01) |
| H04N 21/436 | (2011.01) |
| H04N 21/458 | (2011.01) |
| H04N 21/462 | (2011.01) |

(52) U.S. Cl.
CPC ..... *H04N 21/47214* (2013.01); *H04N 5/4401* (2013.01); *H04N 5/50* (2013.01); *H04N 21/4263* (2013.01); *H04N 21/43615* (2013.01); *H04N 21/4583* (2013.01); *H04N 21/462* (2013.01)

(58) Field of Classification Search
CPC ......... H04N 21/4263; H04N 21/47214; H04N 21/4583; H04N 21/25866; H04N 21/43615; H04N 5/50; H04N 5/4401; H04L 12/28

USPC ............... 725/105, 109–110, 82; 375/E7.019
See application file for complete search history.

(56) References Cited

U.S. PATENT DOCUMENTS

| | | | |
|---|---|---|---|
| 4,139,860 | A | 2/1979 | Micic et al. |
| 5,557,319 | A | 9/1996 | Gurusami et al. |
| (Continued) | | | |

OTHER PUBLICATIONS

Specification and figures of U.S. Appl. No. 61/256,903, filed Oct. 30, 2009 and entitled Methods and Apparatus for Packetized Content Delivery Over a Content Delivery Network (pp. 1-150 and 46 pages of Figures).

*Primary Examiner* — Pinkal R Chokshi
*Assistant Examiner* — Alan Luong
(74) *Attorney, Agent, or Firm* — Gazdzinski & Associates, PC

(57) ABSTRACT

Apparatus and methods for enhanced tuner efficiency, wherein tuner resources function to permit multiple content streams to be demultiplexed and thus made available for subsequent display. In one embodiment, Customer Premises Equipment (CPE) comprises a resource manager on which a guide application is run to control the tuning of an available tuner resource. This approach obviate reliance on OCAP or other proprietary vendor architecture applications. In another variant, the CPE is adapted to receive RF source data from a wideband tuner, or multiple tuners. The CPE may also be utilized in conjunction with other system configurations designed to enforce a security or other policies within a premises network. The CPE may also employ 'look ahead' capabilities to anticipate a QAM stream content before it is received.

33 Claims, 13 Drawing Sheets

(56) References Cited

U.S. PATENT DOCUMENTS

| | | | |
|---|---|---|---|
| 5,765,097 A | 6/1998 | Dail | |
| 5,864,672 A | 1/1999 | Bodeep et al. | |
| 6,259,443 B1* | 7/2001 | Williams, Jr. | 715/741 |
| 6,317,884 B1 | 11/2001 | Eames et al. | |
| 6,381,248 B1 | 4/2002 | Lu | |
| 6,396,531 B1 | 5/2002 | Gerszberg et al. | |
| 6,546,016 B1 | 4/2003 | Gerszberg et al. | |
| 6,577,414 B1 | 6/2003 | Feldman et al. | |
| 6,711,742 B1 | 3/2004 | Kishi et al. | |
| 6,757,906 B1* | 6/2004 | Look et al. | 725/45 |
| 6,765,931 B1 | 7/2004 | Rabenko et al. | |
| 6,804,824 B1 | 10/2004 | Potrebic et al. | |
| 6,889,385 B1 | 5/2005 | Rakib et al. | |
| 6,912,209 B1 | 6/2005 | Thi et al. | |
| 6,927,806 B2 | 8/2005 | Chan | |
| 6,931,018 B1 | 8/2005 | Fisher | |
| 6,965,604 B1* | 11/2005 | Sato et al. | 370/401 |
| 6,978,474 B1 | 12/2005 | Sheppard et al. | |
| 6,985,492 B1 | 1/2006 | Thi et al. | |
| 7,023,868 B2 | 4/2006 | Rabenko et al. | |
| 7,043,750 B2 | 5/2006 | Ina | |
| 7,142,620 B2 | 11/2006 | Buda | |
| 7,184,664 B2 | 2/2007 | Farmer et al. | |
| 7,231,655 B2 | 6/2007 | Brooks | |
| 7,257,106 B2 | 8/2007 | Chen et al. | |
| 7,278,152 B1* | 10/2007 | Rao | 725/91 |
| 7,298,846 B2 | 11/2007 | Bacon et al. | |
| 7,310,423 B2 | 12/2007 | Hobrock | |
| 7,333,483 B2 | 2/2008 | Zhao et al. | |
| 7,366,415 B2 | 4/2008 | Lee et al. | |
| 7,370,343 B1* | 5/2008 | Ellis | 725/58 |
| 7,382,786 B2 | 6/2008 | Chen et al. | |
| 7,458,092 B1* | 11/2008 | Parker et al. | 725/120 |
| 7,529,485 B2 | 5/2009 | Farmer et al. | |
| 7,584,490 B1 | 9/2009 | Schlack | |
| 7,596,801 B2 | 9/2009 | Wall et al. | |
| 7,602,820 B2 | 10/2009 | Helms et al. | |
| 7,657,919 B2 | 2/2010 | Alsobrook et al. | |
| 7,701,954 B2 | 4/2010 | Rabenko et al. | |
| 7,954,131 B2 | 5/2011 | Cholas et al. | |
| 8,180,222 B2 | 5/2012 | Sucharczuk et al. | |
| 8,266,429 B2 | 9/2012 | Helms et al. | |
| 8,312,267 B2 | 11/2012 | Helms et al. | |
| 8,347,341 B2 | 1/2013 | Markley et al. | |
| 8,520,850 B2 | 8/2013 | Helms et al. | |
| 8,738,607 B2 | 5/2014 | Dettinger et al. | |
| 8,949,919 B2 | 2/2015 | Cholas et al. | |
| 2002/0038459 A1 | 3/2002 | Talmola et al. | |
| 2002/0061012 A1 | 5/2002 | Thi et al. | |
| 2003/0005453 A1 | 1/2003 | Rodriguez et al. | |
| 2003/0056217 A1 | 3/2003 | Brooks | |
| 2003/0120742 A1 | 6/2003 | Ohgami et al. | |
| 2003/0133049 A1 | 7/2003 | Cowley et al. | |
| 2003/0217365 A1 | 11/2003 | Caputo | |
| 2004/0031058 A1* | 2/2004 | Reisman | 725/112 |
| 2004/0068739 A1* | 4/2004 | Russ et al. | 725/39 |
| 2004/0101271 A1* | 5/2004 | Boston et al. | 386/46 |
| 2004/0117044 A1 | 6/2004 | Konetski | |
| 2004/0133920 A1 | 7/2004 | Kim et al. | |
| 2004/0156614 A1 | 8/2004 | Bumgardner et al. | |
| 2004/0210944 A1* | 10/2004 | Brassil et al. | 725/135 |
| 2004/0243634 A1* | 12/2004 | Levy | G06F 21/10 |
| 2004/0251887 A1* | 12/2004 | Sparrell | H04L 12/2805 |
| | | | 323/312 |
| 2005/0044570 A1 | 2/2005 | Poslinski | |
| 2005/0055716 A1* | 3/2005 | Louie et al. | 725/58 |
| 2005/0055729 A1 | 3/2005 | Atad et al. | |
| 2005/0064831 A1 | 3/2005 | Fennstra et al. | |
| 2005/0144646 A1 | 6/2005 | Lecrom et al. | |
| 2005/0155052 A1* | 7/2005 | Ostrowska et al. | 725/25 |
| 2005/0165899 A1 | 7/2005 | Mazzola | |
| 2005/0166230 A1* | 7/2005 | Gaydou et al. | 725/41 |
| 2005/0198682 A1* | 9/2005 | Wright | 725/96 |
| 2005/0229221 A1* | 10/2005 | Kerofsky | H04N 21/42607 |
| | | | 725/100 |
| 2005/0238020 A1* | 10/2005 | Hetzel et al. | 370/390 |
| 2005/0289619 A1* | 12/2005 | Melby | 725/95 |
| 2006/0020971 A1* | 1/2006 | Poslinski | 725/44 |
| 2006/0031888 A1 | 2/2006 | Sparrell | |
| 2006/0035610 A1 | 2/2006 | Potrebic | |
| 2006/0041915 A1 | 2/2006 | Dimitrova et al. | |
| 2006/0047957 A1 | 3/2006 | Helms | |
| 2006/0117354 A1* | 6/2006 | Schutte et al. | 725/78 |
| 2006/0117379 A1 | 6/2006 | Bennett et al. | |
| 2006/0130113 A1* | 6/2006 | Carlucci | H04N 7/17318 |
| | | | 725/118 |
| 2006/0136968 A1 | 6/2006 | Han et al. | |
| 2006/0156392 A1 | 7/2006 | Baugher et al. | |
| 2006/0171390 A1* | 8/2006 | La Joie | 370/390 |
| 2006/0218581 A1* | 9/2006 | Ostrowska et al. | 725/38 |
| 2006/0218604 A1 | 9/2006 | Riedl et al. | |
| 2007/0022459 A1 | 1/2007 | Gaebel | |
| 2007/0025372 A1 | 2/2007 | Brenes et al. | |
| 2007/0039028 A1* | 2/2007 | Bar | 725/95 |
| 2007/0044130 A1* | 2/2007 | Skoog | 725/110 |
| 2007/0079340 A1* | 4/2007 | McEnroe | 725/78 |
| 2007/0079341 A1* | 4/2007 | Russ et al. | 725/89 |
| 2007/0121578 A1 | 5/2007 | Annadata et al. | |
| 2007/0121678 A1 | 5/2007 | Brooks et al. | |
| 2007/0153820 A1 | 7/2007 | Gould | |
| 2007/0154041 A1 | 7/2007 | Beauchamp | |
| 2007/0178830 A1 | 8/2007 | Janik et al. | |
| 2007/0217436 A1 | 9/2007 | Markley | |
| 2007/0226365 A1 | 9/2007 | Hildreth et al. | |
| 2007/0250900 A1 | 10/2007 | Marcuvitz | |
| 2007/0276925 A1 | 11/2007 | La Joie | |
| 2007/0294738 A1 | 12/2007 | Kuo et al. | |
| 2008/0098212 A1 | 4/2008 | Helms | |
| 2008/0098450 A1 | 4/2008 | Wu et al. | |
| 2008/0112405 A1 | 5/2008 | Cholas | |
| 2008/0120667 A1 | 5/2008 | Zaltsman | |
| 2008/0127277 A1* | 5/2008 | Kuschak | H04H 60/80 |
| | | | 725/74 |
| 2008/0134165 A1 | 6/2008 | Anderson | |
| 2010/0191525 A1 | 7/2010 | Rabenko et al. | |
| 2011/0002245 A1 | 1/2011 | Wall et al. | |
| 2011/0103374 A1 | 5/2011 | Lajoie et al. | |
| 2011/0145871 A1 | 6/2011 | Lee et al. | |
| 2013/0125194 A1 | 5/2013 | Finkelstein et al. | |

\* cited by examiner

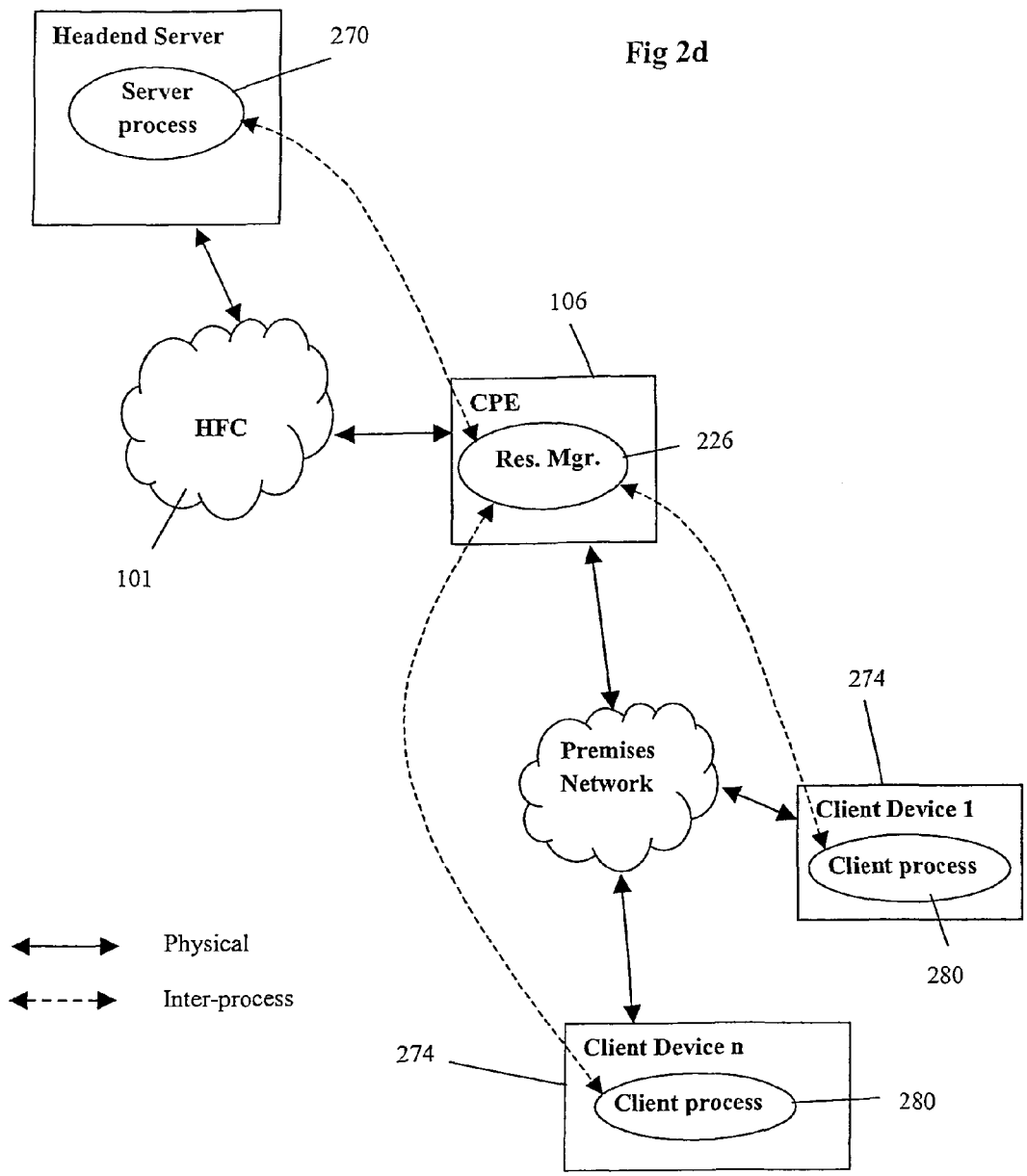

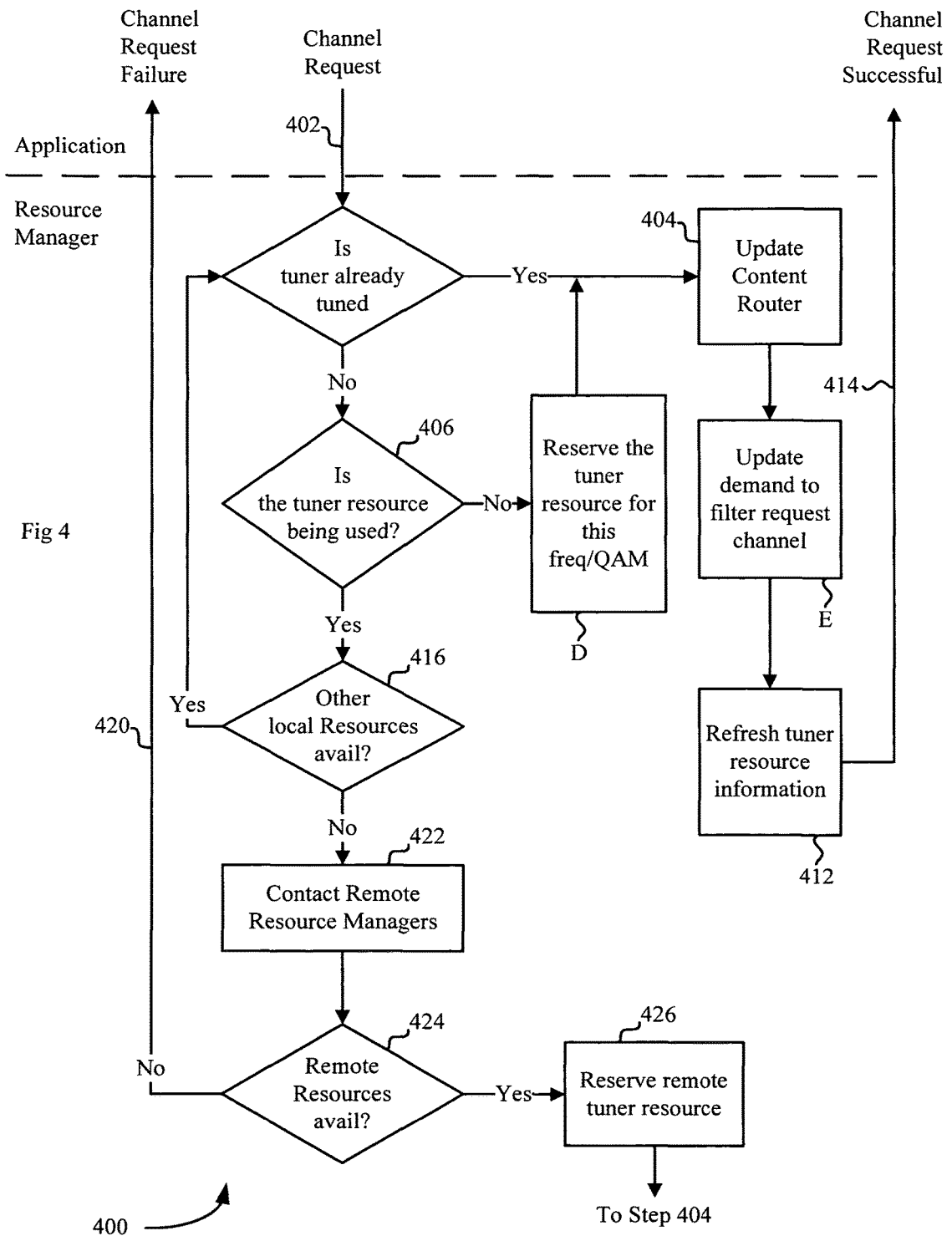

MULTI-STREAM PREMISES APPARATUS AND METHODS FOR USE IN A CONTENT DELIVERY NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related to apparatus and methods for distributing programming content, media, data and other information services via apparatus disposed on a user premises (e.g., residence, enterprise, etc.).

2. Description of Related Technology

Older (e.g., analog) cable television systems utilize a separate tuner resource dedicated to receive, and prepare for viewing, the audio and video stream of a single RF channel (e.g., 6 MHz or 8 MHz).

Current digital cable technology employs compressed digital signals which, via Quadrature Amplitude Modulation (QAM) or similar techniques, potentially allow for the distribution of more channels. For example, by using QAM and digital technology, up to six MPEG 2 audio and video streams can be sent down the same RF channel. Thus, a single tuner resource potentially has access to multiple channels for receipt and route through the set top device simultaneously. However, due in large part to the legacy of the aforementioned analog signals (i.e., on tuner, one stream), current digital systems are not living up to their full potential in terms of delivery of multiple channels over a single RF "QAM". Accordingly, a technique that allows for the utilization and distribution of the content and data of the several streams available via a single or multiple QAM, would be useful in efficiently managing and distributing multiple program streams simultaneously in one premises device.

A variety of premises devices for use with cable television networks which permit multiple channel streams to be distributed from a set top box (STB) are known. For example, patents involving Picture-in-Picture (PIP) technology (such as U.S. Pat. No. 4,139,860 to Micic, et al. issued Feb. 13, 1979 and entitled "TELEVISION RECEIVER EQUIPPED FOR SIMULTANEOUSLY SHOWING SEVERAL PROGRAMS") disclose systems that provide for viewing an image portion from one image signal while simultaneously viewing at least a portion of an image from a different image signal. These systems generally include an image display device, a first tuner and a second tuner. The first and second tuners in these systems are configured to receive first and second image signals, and to output corresponding first and second video signals, respectively.

U.S. Pat. No. 6,927,806 to Chan issued Aug. 9, 2005 entitled "SYSTEMS, METHODS AND APPARATUSES FOR MINIMIZING SUBSCRIBER-PERCEIVED DIGITAL VIDEO CHANNEL TUNING DELAY" discloses a digital STB. The STB is capable of decoding multiple digital video streams simultaneously. The invention also discloses the incorporation of channel look-ahead capabilities, in which one or more digital tuners tune to and decode a next video channel based upon information taken from a subscriber's usage history and information obtained from average subscriber behavior. The invention set forth in the Chan patent utilizes multiple tuners and multiple decoders within an STB to allow for the reception and decoding of multiple channels received from varying frequencies.

U.S. Pat. No. 6,804,824 to Potrebic, et al. issued Oct. 12, 2004 and entitled "SYSTEMS AND METHODS USING MULTIPLE TUNERS" discloses an enhanced user experience by using multiple tuners to simultaneously tune multiple channels. The multiple tuners channels included in programming content, so that a user is able to rapidly tune the channels without having to wait. Other features include the ability to simultaneously record conflicting programs. Each tuner can tune to a separate channel and either display and/or record that channel. The multiple tuners also allow a snapshot of recent channels to be maintained and updated such that a user can be apprised of the current content of those channels without having to separately tune each channel.

United States Patent Publication No. 20030133049 to Cowley, et al. published Jul. 17, 2003 entitled "TUNER ARRANGEMENT AND SET TOP BOX" discloses a multiple tuner arrangement formed on a single integrated circuit having a common radio frequency input terminal. The terminal supplies a broadband input signal to a plurality of individual tuners, which may be identical to each other in construction. The tuners are arranged to operate simultaneously. The tuners select, independently of each other, respective desired channels for reception; convert the desired channels to respective intermediate frequency signals; and supply the respective intermediate frequency signals to the channel output terminal.

United States Patent Publication No. 20040156614 to Bumgardner, et al. published Aug. 12, 2004 entitled "TUNER SHARING VIDEO RECORDER SYSTEM ARCHITECTURE" discloses a shared tuner video recorder system architecture. In one embodiment, multiple set-top boxes are networked and configured to share tuners with each other. If a specific set-top box has no tuners available to schedule a show, it attempts to schedule the show on the tuner of another set-top box in the network.

United States Patent Publication No. 20050044570 to Poslinski published Feb. 24, 2005 entitled "CACHING DATA FROM MULTIPLE CHANNELS SIMULTANEOUSLY" discloses methods and systems for caching data from multiple channels simultaneously. Data specifying a set of channels and a prioritization of the set of channels is received. Channels from the set of channels are selected for which to assign tuners to and then cache data based on the prioritization. Data for the selected channels is cached simultaneously. The tuners may be within a set-top-box. Trick modes may be used to view portions of programs represented by the cached data.

United States Patent Publication No. 20060136968 to Han, et al. published Jun. 22, 2006 entitled "APPARATUS FOR DISTRIBUTING SAME/DIFFERENT DIGITAL BROADCASTING STREAMS IN HETEROGENEOUS HOME NETWORK AND METHOD THEREOF" discloses an apparatus for distributing same/different digital broadcasting streams in a heterogeneous home network and a method thereof. The apparatus includes a home gateway, and a home server, connected to the home gateway through Ethernet and also connected to a PC, a second IP STB, a 1394 STB, an HAS (Home Auto System) and an HDTV receiver, for outputting a ground-wave broadcast, a satellite broadcast and a cable broadcast to their HDTV receivers, respectively, through the second IP STB and the 1394 STB if the ground-wave broadcast, the satellite broadcast and the cable broadcast are received through coaxial cables, interworking with the HAS in order to control home appliances, and directly outputting the broadcast to the HDTV receiver through a built-in STB function. According to the apparatus, a user having a plurality of HDTV receivers at home can simultaneously view a plurality of HDTV broadcasts irrespective of the broadcasting systems when a plurality of heterogeneous home networks match through a home network matching device.

United States Patent Publication No. 20050064831 to Feenstra, et al. published Mar. 24, 2005 entitled "SOFTWARE SIGNAL RECEIVER" discloses a system and method for processing a plurality of received signals within a broad signal space concurrently without the need for multiple hardware tuners. The system includes: a signal directing mechanism for routing a transmitted frequency band into the system, the transmitted frequency band includes a plurality of waveforms, each one of the plurality of waveforms contains information; a storage assembly for storing the transmitted frequency band; a selection assembly for selecting at least one waveform from the transmitted frequency band; a processor for processing information corresponding to the at least one waveform; and a presentation device for presenting the information processed from at least one selected waveform to a user.

United States Patent Publication No. 20050144646 to Lecrom, et al. published Jun. 30, 2005 entitled "METHOD AND APPARATUS FOR A RECEIVER/DECODER" discloses a method and apparatus relating to a receiver/decoder in a digital television environment, including logical devices (including logical demultiplexer devices) for representing physical and other devices in the receiver/decoder. The method includes the instantiation of devices by the receiver/decoder as required to support functionality thereof. The method further includes the use of multiple demultiplexers/remultiplexers, for example in the recording of more than one service simultaneously; and a control word device for the management of control word operations; the use of two or more tuners. Various elements of a digital television system (such as a receiver/decoder and a set top box) are also disclosed.

United States Patent Publication No. 20040247122 to Hobrock, et al. published Dec. 9, 2004 entitled "PROCESSING MULTIPLE ENCRYPTED TRANSPORT STREAMS" discloses a single decryption engine used for decrypting a plurality of encrypted transport streams. Packets in each of the plurality of encrypted transport streams are tagged with a tag value to indicate their origin stream. The tagged packets from the plurality of encrypted transport streams are merged into a merged transport stream. The packets in the merged transport stream are decrypted with the decryption engine to produce a decrypted merged transport stream. The decrypted merged transport stream is split into a plurality of decrypted transport streams, equal in number to the plurality of encrypted transport streams, by routing packets in the decrypted merged transport stream to specific decrypted transport streams according to their tag value. A null-packet padding technique, a gapped-clock technique and a multi-port static RAM controller technique are also disclosed.

Co-owned and co-pending United States Patent Publication No. 20060130113 to Carlucci, et al. published Jun. 15, 2006 and entitled "METHOD AND APPARATUS FOR WIDEBAND DISTRIBUTION OF CONTENT", which is incorporated herein by reference in its entirety, discloses a method and apparatus to create and transmit transport multiplexes comprising one or more levels of service over a network. In one embodiment, the level of service comprises high definition (HD) content or programs, and the transmitted multiplexes are distributed over a plurality of downstream RF carriers in a cable network simultaneously. A headend architecture for performing the multiplexing and distribution of multiple HD programs over the multiple carriers (i.e., in a "wideband" configuration) is disclosed. CPE having one or more wideband tuners is also disclosed, the CPE being adapted to receive the multiplexed HD content from the various RF carriers, and demultiplex it in order to permit decoding and subsequent viewing by the user. The use of multiple HD source programs with the multiplex advantageously provides for enhanced statistical multiplexing by providing a larger "pool" of constituent inputs and available carriers.

Co-owned U.S. patent application Ser. No. 11/818,236 filed Jun. 13, 2007, entitled "PREMISES GATEWAY APPARATUS AND METHODS FOR USE IN A CONTENT-BASED NETWORK", and issued as U.S. Pat. No. 7,954,131 on May 31, 2011, which is incorporated herein by reference in its entirety, discloses apparatus and methods for premises gateway functions that integrate or unify functions typically distributed across multiple devices within a content-based network. In one embodiment, the out-of-band (OOB) signaling functionality normally provided in each of a set-top-box (STB) and digital video recorder (DVR) are unified into a common OOB (e.g., DOCSIS) capable premises gateway device, thereby obviating OOB tuners and related components from each device. In another variant, the premises gateway is adapted for all-IP operation, such as for use with IP-based computers and IP set-top boxes, etc. Fully unified variants are also disclosed, wherein the DVR and/or STB functions are physically integrated within the premises gateway.

However, despite the foregoing variety of devices and configurations for use with cable television networks which permit multiple channel streams to be distributed from a single set top box (STB), the delivery of multiple content streams is still substantially disparate in the abovementioned inventions in terms of their hardware and software environments. This is particularly true given that the majority of the aforementioned STB require multiple tuners to perform the desired function. This adds cost not only for the consumer (e.g., those buying retail devices), but also to the network operator such as a cable MSO, since they must expend more in outfitting a subscriber with given capabilities than they would otherwise, were less costly and less duplicative technologies used.

Furthermore, the aforementioned systems may rely on OpenCable Application Program (OCAP) or on proprietary vendor applications to control the tuning function (and other aspects of the tuner resources).

Hence, there remains a salient need for improved apparatus and methods that maximize operational efficiency within a content-based network (such as a cable television network) by fully utilizing the entire RF source content which enters the premises via the STB; e.g., by accessing multiple program streams on a single QAM.

Such improved apparatus and methods would also ideally reduce the capital costs related to deployment of customer premises equipment.

Such solutions would also ideally be independent of or agnostic to OCAP or other proprietary vendor architectures with respect to control the tuning and other aspects of tuner resources.

SUMMARY OF THE INVENTION

The present invention satisfies the foregoing needs by providing, inter alia, improved apparatus and methods for premises content management and delivery.

In accordance with a first aspect of the invention, a network resource management apparatus is disclosed. In one embodiment, the apparatus is adapted to manage a plurality of tuner resources within one or more premises devices, the resource manager comprising first apparatus adapted to: receive information regarding the plurality of tuner resources; process the information; and control the plurality of tuner resources according to at least one resource management policy.

In one variant, the information comprises status information comprising at least one of: (i) the current frequency to which at least one of the tuner resources is currently tuned; (ii) the programs that are available on the current frequency; and (iii) the program identifications associated with the programs available on the current frequency.

In another variant, the apparatus is further adapted to maintain a content routing table, the routing table comprising information at least relating a plurality of programs and respective routing thereof. The control comprises, e.g., reserving at least one of the plurality of tuner resources; and directing the reserved at least one tuner resource to distribute a first program stream from the routing table to at least one receiving apparatus.

In another variant, the apparatus is further adapted to direct the reserved at least one tuner resource to distribute a second program stream from the routing table to at least one receiving apparatus concurrently with the distribution of the first stream.

In still another variant, the apparatus comprises a storage medium, and an object-oriented computer program stored at least partly on the medium. It further comprises: a processor in data communication with the storage medium, the processor capable of executing the computer program; and an interface adapted to communicate data or signals between the plurality of tuner resources and the processor. The plurality of resources comprise a plurality of radio frequency (RF) tuners each adapted to tune to and receive at least one quadrature amplitude modulated (QAM) signal, and at least one demodulator, the demodulator adapted to demodulate the at least one quadrature amplitude modulated (QAM) signal. The at least one demodulator is in communication with the processor and is at least partly controllable thereby.

In another variant, the at least one resource management policy comprises a network operator-specified policy that is communicated to the resource management apparatus over the network. Alternatively (or in combination), the at least one resource management policy may comprise a subscriber or user-specified policy.

In a further variant, the plurality of tuner resources comprises at least one out-of-band (OOB) tuner, and the resource management apparatus is adapted to control the at least one OOB tuner. The at least one OOB tuner may be for example disposed on a second platform physically separate from a first platform of the resource management apparatus, such as a digital video recorder.

In a second aspect of the invention, Customer Premises Equipment (CPE) adapted to manage a plurality of tuner resources is disclosed. In one embodiment, the CPE comprises: an RF front end, the front end adapted to at least receive signals from a distribution network; a demultiplexer in signal communication with the front end and adapted to demultiplex a plurality of program streams from at least one multiplexed transport; and a resource manager in signal communication with at least the RF front end and the demultiplexer, the resource manager adapted to distribute the plurality of program streams to respective ones of receiving devices in communication with the CPE.

In one variant, the RF front end comprises a plurality of RF tuners.

In another variant, the RF front end comprises at least one wide-band tuner, the at least one wideband tuner being capable of tuning to and receiving a plurality of RF channels simultaneously.

In yet another variant, the demultiplexer further comprises an internal filter, the filter adapted to facilitate selective identification and recovery of the plurality of program streams from the transport. The internal filter comprises for example a program identification (PID) filter, and selective identification and recovery is based at least in part on PIDs associated with each of the plurality of streams.

In still a further variant, the resource manager is further adapted to: receive status information regarding the plurality of tuner resources; process the resource status information; and decrypt at least a portion of the plurality of streams.

In a third aspect of the invention, a method of operating a premises device in a cable network is disclosed. In one embodiment, the premises device has at least one tuner resource associated therewith, and the method comprises: providing a resource manager adapted to determine the availability of the at least one tuner resource and control the tuning thereof; receiving at least one composite transport comprising a plurality of individual program streams; receiving information relating to the plurality of individual streams; processing the information using the resource manager; and implementing at least one content distribution scheme based at least in part on the processed information, the distribution scheme distributing individual ones of the plurality of streams to respective ones of receiving, content rendering, and/or content storage devices.

In one variant, the information comprises information received over an out-of-band tuner, the information relating to the plurality of individual streams in the transport, the transport being received over an in-band tuner.

In another variant, the control of the tuning of the at least one tuner resource comprises: determining the availability of the at least one tuner resource; reserving the at least one resource; causing, if required, the reserved tuner resource to tune to a specified channel; and updating a content router associated with the resource manager as to the status of the tuner resource.

In still another variant, the receiving at least one composite transport comprises receiving the at least one transport via a wide-band tuner adapted to receive a plurality of RF channels simultaneously.

In yet a further variant, the method further comprises: providing a plurality of consumer devices; and placing the plurality of consumer devices in signal communication with the premises device, thereby establishing a premises network. The plurality of consumer devices may exchange protected content with at least the premises device without the use of an entity outside of the premises network.

In another variant, the information comprises data regarding the bitrate profile of at least a portion of the plurality of individual streams. For example, the data regarding the bitrate profile of at least a portion of the plurality of individual streams is used by the resource manager as at least part of the determination on how to distribute each of the streams.

In a fourth aspect of the invention, a method of operating a premises device in a cable network is disclosed. In one embodiment, the premises device has at least one tuner associated therewith, and the method comprises: providing a resource manager adapted to control the tuning of the at least one tuner; providing an application enabled to run on the premises device, the application being configured to generate a request for at least one content element and provide the request to the resource manager; receiving a transport stream at the premises device; and obtaining the requested at least one content element from the transport stream using the resource manager.

In one variant, the application contains no capability to identify or utilize the at least one tuner itself to obtain the requested content element from the stream.

In another variant, the application cannot obtain the content element via the user without use of the resource manager.

In yet another variant, the application is adapted to be substantially agnostic to the resource manager so that the application can be run on at least one other premises device.

In a fifth aspect of the invention, a method of doing business is disclosed. In one embodiment, the method comprises: providing a premises device having at least an in-band network interface, an out-of-band (OOB) network interface capable of receiving a multiplexed transport, and a resource manager adapted to control the in-band and OOB interfaces, to a subscriber; providing a video rendering or recording device to the subscriber; and operating the resource manager to extract a plurality of individual transport streams from the multiplexed transport and distribute at least one of the streams to the rendering or recording device.

In one variant, the rendering or recording device has no out-of-band network interface, and the method further comprises using the at least OOB interface of the premises device for OOB communications between the rendering or recording device and the network.

In a sixth aspect of the invention, a method of controlling content distribution within a premises network is disclosed. In one embodiment, the method comprises: providing a premises device adapted to interface with a content delivery network; receiving, at the premises device, at least one multiplexed transport comprising a plurality of individual program streams; representing at least a portion of the program streams on a graphical user interface (GUI) as a plurality of first graphical objects; representing a plurality of other devices in communication with the premises device as respective ones of a plurality of second graphical objects; and enabling a user of the GUI to associate ones of the program streams with ones of the other devices via at least one of the first and second graphical objects.

In one variant, the act of enabling comprises providing a drag-and-drop functionality whereby the first objects can be dragged and dropped onto respective ones of the second objects, thereby forming the association.

In a seventh aspect of the invention, a storage apparatus is disclosed. In one embodiment, the storage apparatus comprises a computer readable medium storing a computer program, the computer program comprising a plurality of instructions which, when executed: receive information regarding the plurality of tuner resources; process the information; and control the plurality of tuner resources according to at least one resource management policy.

In an eighth aspect of the invention, a network software architecture adapted for delivery and extraction of multiple program streams from a single multiplexed transport is disclosed. In one embodiment, the architecture comprises: a first software component disposed on a network server; and a second software component disposed on at least one network receiver. The first and second components are in communication over the network or another communications modality, and the first component controls at least portions of the functionality of the second component in order to implement one or more resource management policies with respect to the identification, extraction and distribution of the individual content streams from the multiplexed transport.

BRIEF DESCRIPTION OF THE DRAWINGS

FIG. 2d is a block diagram of one exemplary implementation of the resource manager software architecture of the invention, wherein a distributed application (DA) is used.

FIG. 4 is a logical flow diagram of one exemplary algorithm for managing and utilizing a plurality of tuner resources.

DETAILED DESCRIPTION OF THE INVENTION

Figure 1:
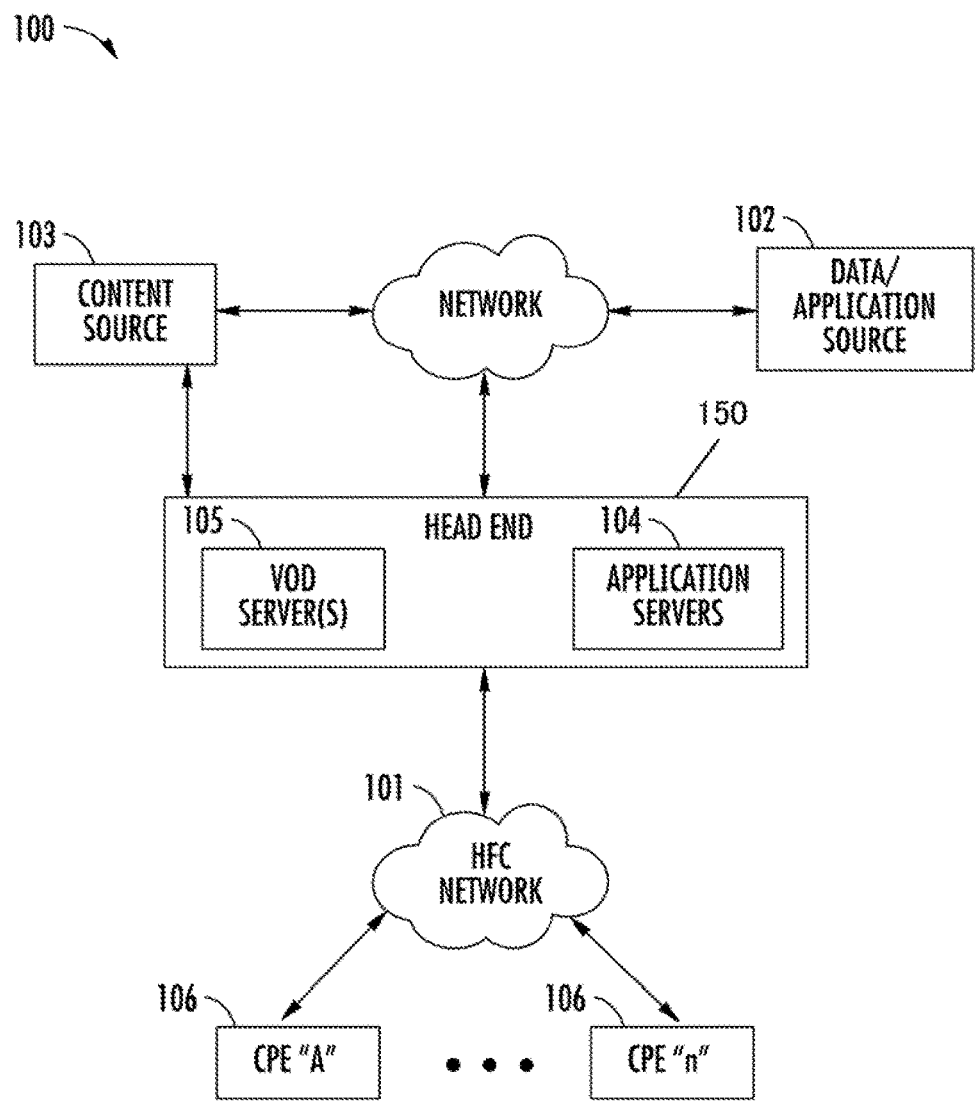
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the terms "display" and "monitor" mean any type of device adapted to display information, including without limitation CRTs, LCDs, TFTs, plasma displays, LEDs, incandescent and fluorescent devices.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "program channel" is generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity, such as a GUI.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, methods and apparatus for the identification, processing and distribution of multiple transport streams by an individual Customer Premises Equipment (CPE) tuner. In one exemplary variant, the CPE employs a resource manager that is adapted to communicate with multiple tuner resources and other CPE assets (such as the demodulator). The resource manager receives information from the tuners as to their status, availability, etc. and utilizes this information to reserve at least one of the tuners. The resource manager enables the reserved tuner and CPE to deliver multiple available single transports streams (SPTSs) to various connected receiving, storage, or distribution apparatus within the premises from a single multiplexed input stream (MPTS) transmitted from the headend or hub. The resource manager is able to manage all of the RF source carrier frequencies (e.g., "QAMs") entering the device, including both in-band and out-of-band channels. This approach is particularly useful to help reduce a cable provider's capital expenditures in manufacturing consumer premises equipment (CPE), since it reduces the amount of hardware required in a home or other premises.

Furthermore, this approach is useful in providing for the full utilization of the entire contents of the QAM stream or streams tuned, thereby providing downstream bandwidth economization. For example, a typical CPE tuner may be able to terminate 54 Mbps of downstream bandwidth; however, all of this bandwidth may not be usable by a prior art CPE. Using the approach of the present invention, in contrast, more of that terminated 54 Mbps can be utilized, thereby effectively increasing downstream bandwidth utilization efficiency.

Moreover, the foregoing approach places tuner resource control under the resource manager, as opposed to the requesting application(s), thereby decoupling this control from the applications. This approach has the advantage of allowing applications to be simplified and be agnostic to the underlying control mechanism (i.e., resource manager) as opposed to requiring proprietary (e.g., OCAP) mechanisms to support tuner discovery and control. Under typical prior art approaches, the OCAP or other application effectively "grabs" a tuner resource that is available every time it requires a content stream. In contrast, the resource manager of the present invention allows for, inter alia, determining whether a new resource (e.g., tuner) is really required for each request, or whether an already utilized resource can support the requirement, thereby conserving limited resources.

The present invention can also be advantageously utilized to consolidate the control and use of out-of-band tuner resources as well, thereby further reducing capital costs associated with subscriber premises installations.

In another embodiment, the CPE is adapted to manage all of the RF source carrier frequencies which enter a device via a wideband tuner, or via multiple tuners.

Also, the CPE may be configured to receive dynamic updates to the resource manager software (including "on-the-fly" updates to resource management and content distribution policies) from the headend or another network node.

In yet other embodiments, the CPE is adapted to act as a local (e.g., premises) network content server, with various connected premises or client devices requesting content, and the CPE serving such requests.

DETAILED DESCRIPTION OF EXEMPLARY EMBODIMENTS

Exemplary embodiments of the apparatus and methods for CPE resource management according to the present invention are now described in detail. While these exemplary embodiments are described in the context of the aforementioned hybrid fiber coax (HFC) cable system architecture having an multiple systems operator (MSO), and digital networking capability, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain or premises, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. For example, the present invention may be used with the methods and apparatus described in co-owned and co-pending United States Patent Publication No. 20060130113 to Carlucci, et al. published Jun. 15, 2006 and entitled "METHOD AND APPARATUS FOR WIDEBAND DISTRIBUTION OF CONTENT" previously incorporated by reference herein, discussed in greater detail subsequently herein. Other approaches may be used as well.

Other features and advantages of the present invention will immediately be recognized by persons of ordinary skill in the art with reference to the attached drawings and detailed description of exemplary embodiments as given below.

Network—

FIG. 1 illustrates a typical content-based network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. The CPE will be discussed in greater detail below.

Figure 1A:
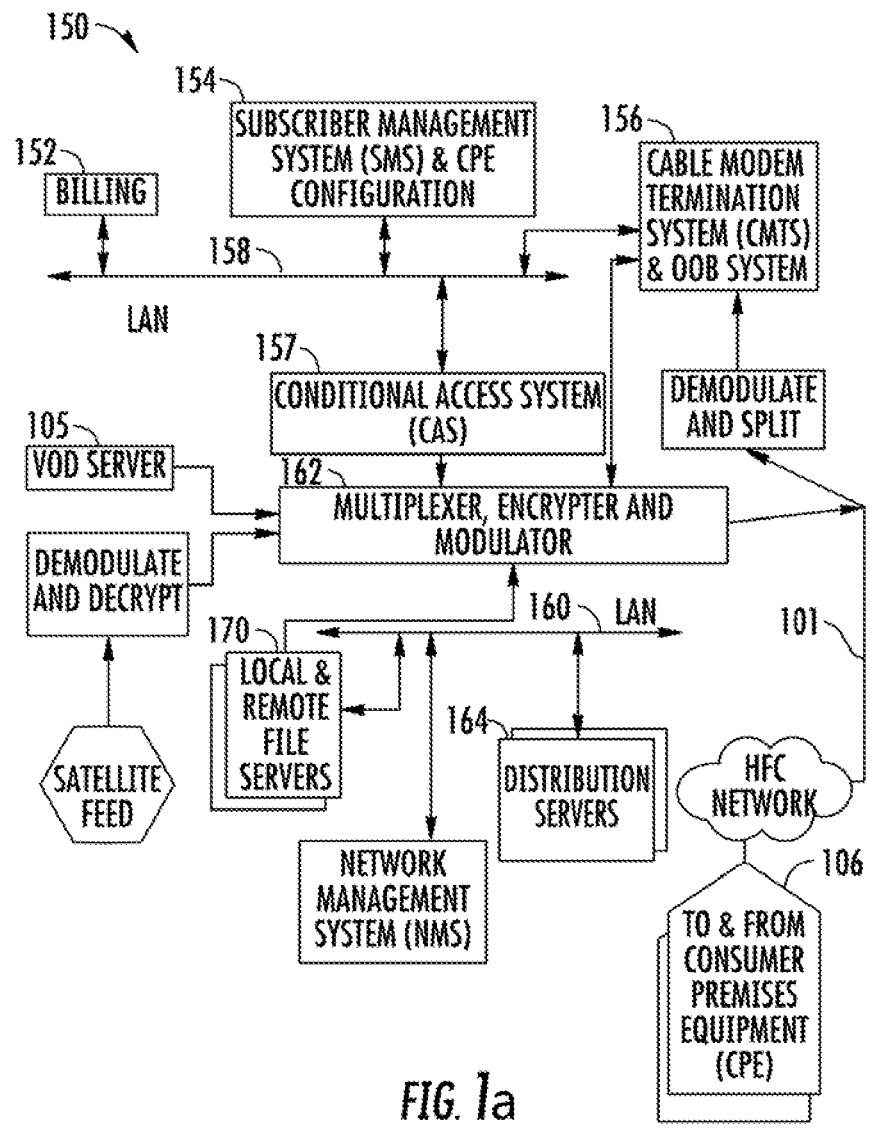
FIG. 1a is a functional block diagram illustrating one exemplary HFC cable network headend configuration useful with the present invention.
Figure 1B:
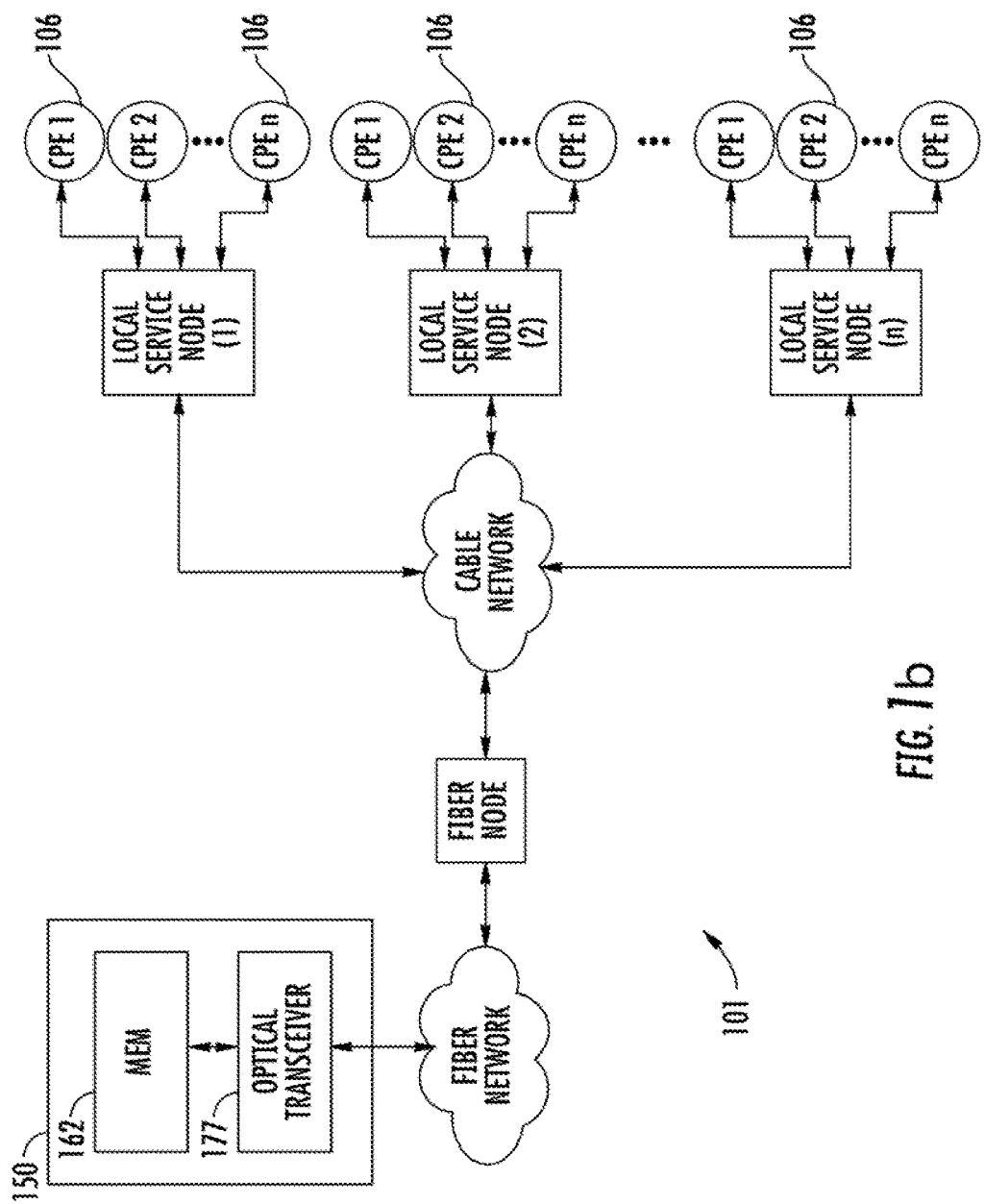
FIG. 1b is a functional block diagram illustrating one exemplary local service node configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs via a variety of interposed network components.

Content (e.g., audio, video, data, files, etc.) is provided in each downstream (in-band) channel associated with the relevant service group. As discussed in greater detail subsequently herein, modulated RF carriers (e.g., "QAMs") may carry a plurality of different multiplexed program streams simultaneously to the subscriber premises.

To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

Figure 1C:
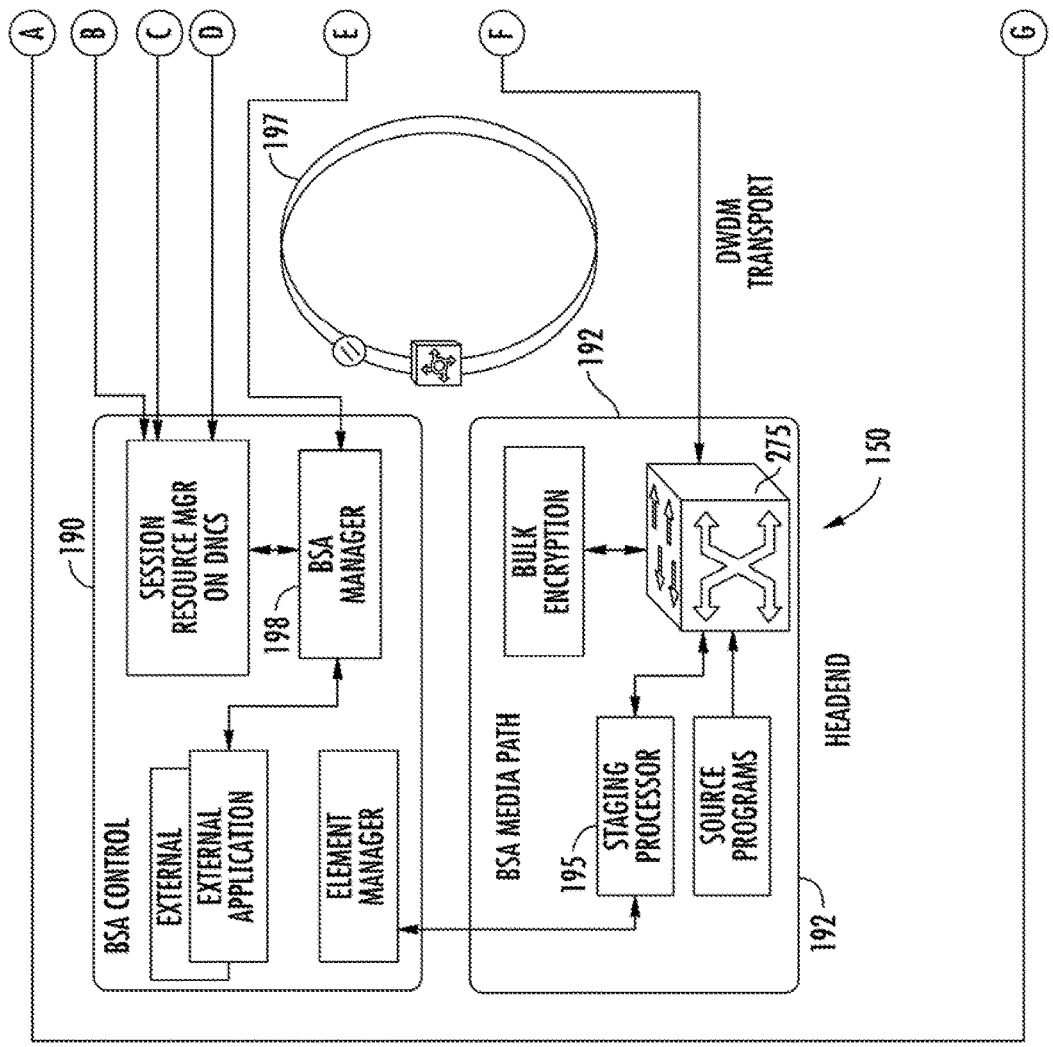
FIG. 1c is a functional block diagram illustrating one exemplary broadcast switched architecture (BSA) network useful with the present invention.
Figure 1C:
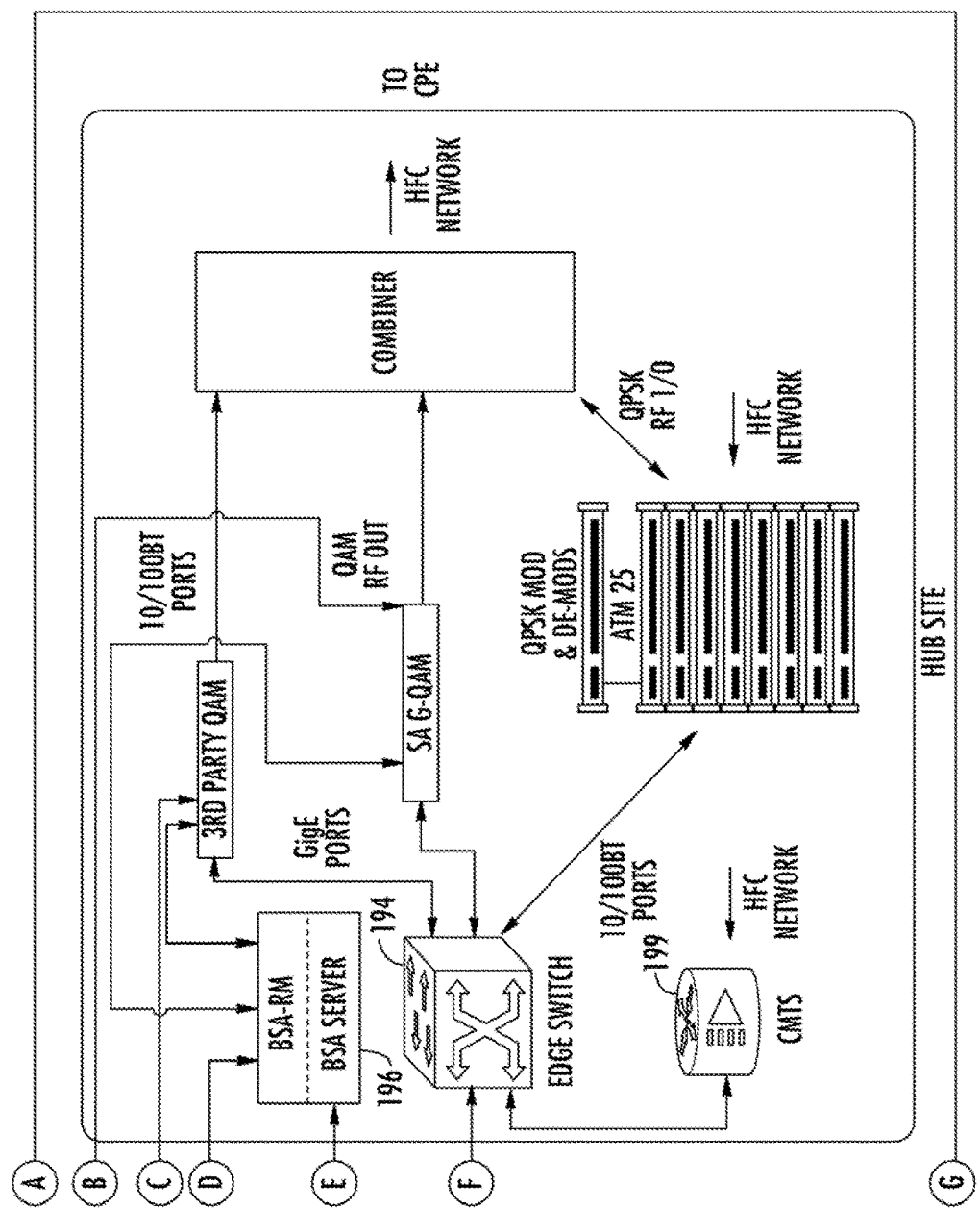

FIG. 1c illustrates exemplary "switched" network architecture also useful with the apparatus and features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these elements cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture useful with the present invention, although it will be recognized by those of ordinary skill that other approaches and architectures may be substituted.

Premises Equipment—

Figure 2A:
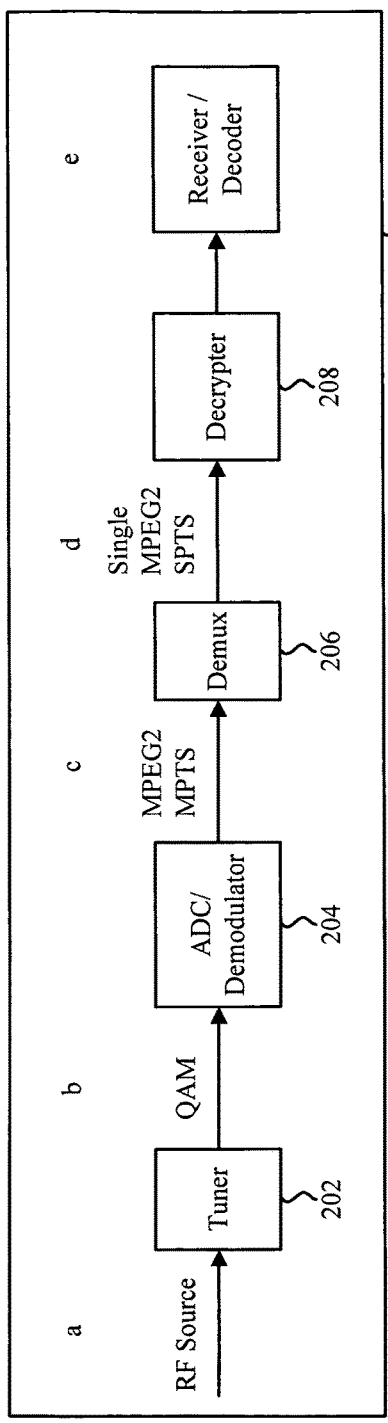
FIG. 2a is block diagram illustrating a typical prior art consumer premises device.

FIG. 2a illustrates the configuration of a typical prior art consumer premises device (e.g., set-top box). Typically, program channel content is transmitted downstream from the cable headend or a BSA switching node over in-band frequencies. The set top box (STB) receives signals from the network (a) via coaxial cable with multiple carriers between frequencies 50-1000 MHz. The tuner 202 selects a single 6 MHz frequency band (QAM) over which it receives the transmitted content, and outputs it (b) to a demodulator 204. The demodulator 204 demodulates the signal (and performs any analog-to-digital conversion if required), and then outputs (c) a standard MPEG 2 Multi Program Transport Stream (MPTS) to the demultiplexer 206. The demultiplexer 206 demultiplexes the MPTS and retrieves an individual Single Program Transport Stream (SPTS) to output (d) to a decrypter 408. The program stream may for example correspond to a program channel being delivered over the network.

The decrypter 208 then decrypts the content and outputs (e) it to a receiving apparatus. The receiving apparatus may be an internal or an external device. These signals may also be distributed via e.g., a back-end interface to DVRs, personal media devices (PMDs), and the like. It is noted that the system of FIG. 2a relies on an OpenCable Application Program (OCAP) or proprietary vendor architecture-run application to directly control the tuner.

Figure 2B:
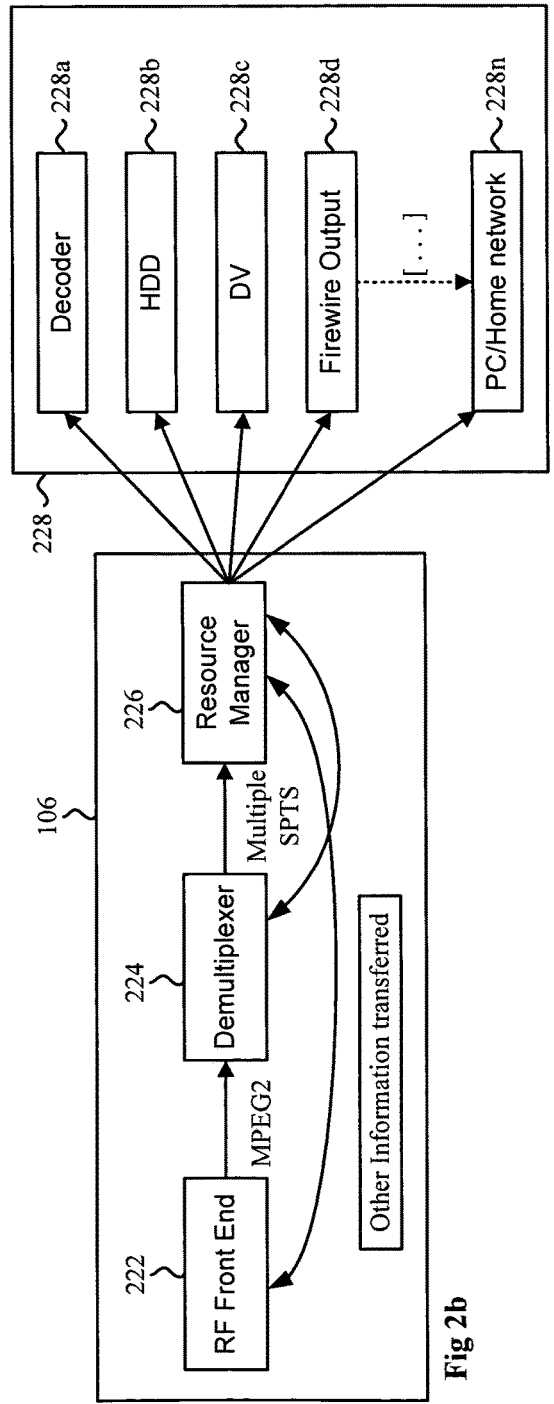
FIG. 2b is an illustration of one generalized exemplary embodiment of multi-stream capable Customer Premises Equipment (CPE) adapted for use in a cable television network according to the present invention.

FIG. 2b is a generalized block diagram of one embodiment of the premises device according to the present invention. The device comprises an RF front-end 222 which is adapted to receive RF signals and demodulate them (and convert them to the digital domain if required). The RF front-end 222 may be adapted to receive an RF signal via one or more standard tuners, or may utilize one or more wideband tuners as previously described. The RF front-end 222 then transmits the derived digital program stream information in standard MPEG2MPTS format to a demultiplexer 224. The demultiplexer 224 is adapted to demultiplex the content of all of the several Single Program Transport Streams (SPTS) contained within the MPTS received. In one variant, the demultiplexer is specifically adapted to evaluate multiple program IDs (PIDs) which are assigned to the respective program streams which make up the transport multiplex. The demultiplexer 224 then transmits the several demultiplexed transport streams to the resource manager 226. The resource manager 226 maintains a routing table or other similar reference mechanism for the selection of the several content streams available. The exemplary embodiment of the routing table stores, inter alia, the routes of the particular network destinations of every SPTS which was present in the MPTS received. The resource manager 226 is also adapted to transmit one or more of the content streams to receiving apparatus 228 which may include, for example, devices (228a . . . 228n) adapted to display, encode/decode, distribute and/or store the information including (but not limited to) an internal decoder 228a, a hard disk drive (HDD) 228b, a DVR 228c, IEEE Std. 1394 "Firewire", USB, or similar output 228d, or a PC or home network 228n (e.g., an Ethernet, MoCA or WiFi LAN). The resource manager 226 is further adapted to transmit several different SPTS streams to separate receiving devices simultaneously.

In this manner, several programs may be viewed or otherwise utilized on separate receiving or processing devices at the same time. Further, a consumer may be permitted to store a particular SPTS while viewing a separate program resulting from a distinct SPTS, or view two streams simultaneously on the same device (e.g., using a "picture-in-picture" or other such simultaneous display management technique).

The exemplary resource manager 226 is also adapted to receive information (via e.g., the RF front-end 222 and the demultiplexer 224) relating to the current frequency band (QAM), the program streams being delivered on that frequency, and the program IDs (PIDs) associated with those program streams. The resource manager 226 obtains this information in the exemplary embodiment from the PMT (program map table), PAT (program association table) and NIT (network information table) that is transmitted in the MPEG 2 MPTS, although other approaches may be used. In other words, the MPEG 2 MPTS delivered to the demultiplexer 224 will contain information from the PAT, the PMT and/or the NIT as required. Specifically, the PAT contains the corresponding PID information of the PMT, and the corresponding PID information of the NIT for each program. It is through receiving and processing the above information that the resource manager 226 in the CPE is able to manage the tuner resources. The demultiplexer 224 transmits this information to the resource manager 226, and the resource manager communicates with the tuner, demodulator, and demultiplexer in order to control those devices. It will also be noted that the resource manager 226 can include additional intelligence; e.g., one or more algorithms which can analyze the aforementioned PMT, etc. information in order to implement one or more business or operational policies or rules. As a simple example, program streams identified as "Adult" or having a certain rating inappropriate for younger viewers can be selectively routed to only certain devices within the premises (e.g., only the DVR or monitor in the parent's room). As another example, only certain streams may be decrypted so as to provide enhanced content protection during transit to a connected premises device, the latter which performs the decryption of the content only when certain prescribed conditions (such as proper authentication and public/private key exchange) are completed.

It will also be appreciated that the resource manager 226 may receive the above-referenced information via other channels or sources as well, such as for example via DOCSIS or out-of-band (OOB) channels.

The exemplary resource manager 226 of FIG. 2b processes information from the RF front-end 222 and the demultiplexer 224, and utilizes the information to control the tune of the various tuner resources of the system (which may be controlled individually), and route the content streams to the receiving apparatus 228 via the its software process as previously described. This approach obviates application-based tuning resource discovery and control mechanisms, such as those found in the prior art system of FIG. 2a, thereby rendering the resource manager, demodulator, PID filter, and tuning resources substantially independent of the requesting application (e.g., guide). Stated differently, the resource manager and other components necessary to select and allocate resources such as tuners are not in the present invention intrinsically tied to the application requesting the resource. Accordingly, the application can be made simpler, as well as not requiring the same level of validation or certification (e.g., to OCAP requirements).

Moreover, as previously discussed, under typical prior art approaches, the OCAP or other application effectively "grabs" a tuner resource that is available every time it requires a content stream. In contrast, the resource manager of the present invention allows for, inter alia, determining whether a new resource (e.g., tuner) is really required for each request, or whether an already utilized resource can support the requirement, thereby conserving limited resources.

However, it will be recognized that the aforementioned application-based control approach may be used in conjunction with the invention if desired, such as e.g., for dedicated control one tuner resource.

Figure 2C:
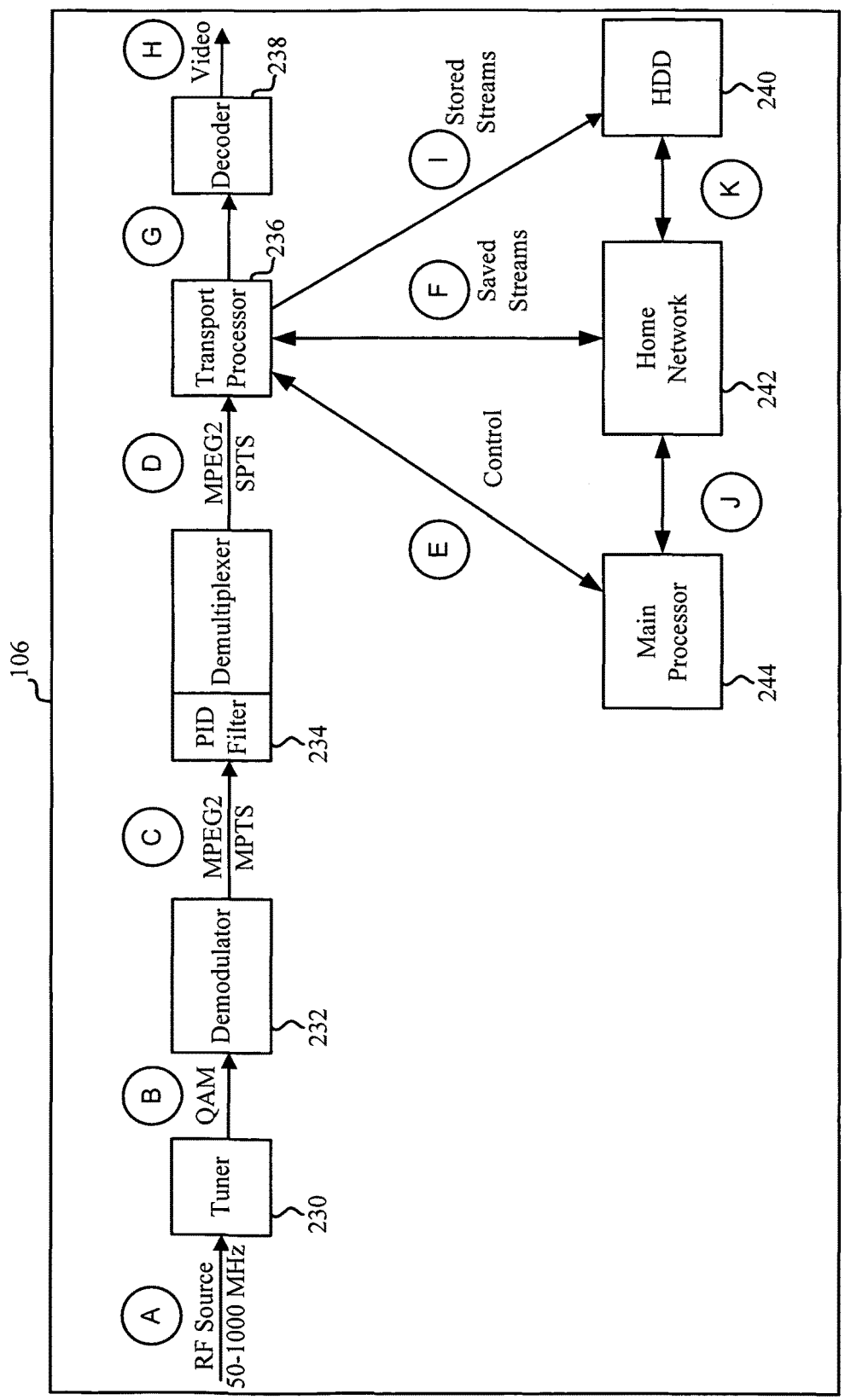
FIG. 2c is a block diagram of one exemplary implementation of the CPE of FIG. 2b.

FIG. 2c shows another exemplary embodiment of the premises device according to the invention, and the progression of the received signal through the apparatus. In this embodiment, additional components including a modified PID filter and transport processor are utilized (i.e., able to handle multiple PIDs and route multiple streams to distinct locations/receivers). As illustrated in FIG. 2c, the tuner 230 receives RF source information (step "A" on FIG. 2c). The tuner 230 tunes, or selects, a single 6 MHz or 8 MHz carrier under the direction of the resource manager, and outputs the received signal on that carrier to the demodulator 232 (step "B"). The demodulator 232 demodulates the data transmitted on the tuned carrier frequency to produce a standard MPEG 2 Multi Program Transport Stream (MPTS) (step "C"). The MPTS enters the demultiplexer 234 which is adapted to include a MPEG 2 Program Identifier (PID) filter. The PID filter of the illustrated embodiment has been adapted to allow the demultiplexer 234 to locate and retrieve several Single Program Transport Streams (SPTSs) of interest. The demulitplexer 234 outputs these streams (step "D") to the Transport Processor (TP) 236 which inter alia decrypts the streams and determines the destination(s) of the decrypted streams. Alternatively, one or more streams may be left encrypted and sent to a connected device for local decryption so as to, e.g., provide data confidentiality/integrity protection in transit, or enforce local authorized service domain (ASD) or trusted domain (TD) security policies.

In the illustrated embodiment, the TP comprises an integrated circuit (IC) configured to examine the several SPTSs arriving on its input, and route each stream accordingly. The TP may also include a variety of other functions such as network layer processing, security functionality, etc. For example, the exemplary transport processor described in co-owned and co-pending U.S. patent application Ser. No. 11/584,208 entitled "Downloadable Security and Protection Methods and Apparatus" filed Oct. 20, 2006, issued as U.S. Pat. No. 8,520,850 on Aug. 27, 2013, and incorporated herein by reference in its entirety, may be used consistent with present invention, although other approaches and device configurations may be used with equal success.

In the illustrated embodiment, the main processor 244 (e.g., CISC microprocessor) runs the resource manager 226 application previously described necessary to aid in routing of the several content streams, as well as the requesting (e.g., guide) application. Thus, the main processor 244 (via the resource manager 226) is used to implement the functionality in the present invention, in contrast to an OCAP or proprietary vendor application or architecture containing a tuning algorithm that determines whether a tuner resource is available and then controls the tune, as in the prior art. It will be appreciated, however, that the resource manager process 226 or guide application(s) may be run on a processor other than the main processor 244 if desired, such as for example the aforementioned TP 236, or a network processor (NP) associated with the CPE (not shown).

The main processor 244 (via the resource manger 226) communicates with the tuner 230, demodulator 232, PID filter and demultiplexer 234, and maintains information about those resources that indicate the current QAM to which the tuner has tuned, the program streams that are available on that QAM, and the PIDs associated with those program streams. As discussed above, the resource manager 226 obtains this information from the PMT, PAT and NIT that is transmitted in the MPEG 2 MPTS. The resource manager 226 also maintains a routing table for the transport processor 236 in order to control the routing destinations of the several SPTS. The resource manager 226, thereby controls the transport processor 236 which may route the streams to several devices including, for example, an internal hard drive 240 for storage (step "I"), a local decoder 238 (step "G") in order to for the content to be viewed (step "H") on a display, or a home network 242 (step "F") to be remotely decoded.

The foregoing apparatus may also be used for receiving and processing DOCSIS QAMs, including those with multiple streams present.

The present invention can also be advantageously utilized to consolidate out-of-band or other tuner resources. For example, in one variant, the out-of-band tuner(s) associated with a given device are "proxied" to the resource manager 226, thereby permitting the resource manager 226 to manage these as well. In one variant, the resource manager 226 receives out-of-band information from the tuner resources (e.g., OOB tuners) it manages. The resource manager 226 processes received out-of-band information in order to determine where such information should be distributed, and distributes it accordingly. For example, the resource manger 226 can receive out-of-band information from a network entity such as a headend or hub server or process via an OOB channel and one or more OOB tuners associated with the CPE 106 or even another device within the premises network (e.g., a DVR with OOB tuner). See, e.g., co-owned U.S. patent application Ser. No. 11/818,236 filed Jun. 13, 2007, entitled "PREMISES GATEWAY APPARATUS AND METHODS FOR USE IN A CONTENT-BASED NETWORK", and issued as U.S. Pat. No. 7,954,131 on May 31, 2011, previously incorporated herein, which discloses apparatus and methods that integrate or unify functions typically distributed across multiple devices within a content-based network. In one embodiment, the out-of-band (OOB) signaling functionality normally provided in each of a set-top-box (STB) and digital video recorder (DVR) are unified into a common OOB (e.g., DOCSIS) capable premises gateway device, thereby obviating OOB tuners and related components from each device. This unified OOB signaling functionality (including OOB tuner) can readily be controlled by the resource manager 226 of the present invention.

As previously noted, one alternative embodiment of the RF front end 222 of the Customer Premises Equipment (CPE) 106 is adapted to receive content via the use of multiple tuners, or alternatively a wideband tuner. In one such variant, the CPE 106 comprises an RF front end 222 including multiple independent tuners adapted to tune to several different QAMS (e.g., in-band content/DOCSIS) that are delivered over the network 101. According to this embodiment, the content of the QAM associated with the first tuner is utilized, as described above, by the CPE 106 such that the entire content is demodulated, demultiplexed, and maintained by the resource manger 226 in the content router table for subsequent distribution. The other QAMs (i.e., those associated with the other tuners) may also be maintained by the resource manager in similar fashion, or operated as a "single stream" system akin to the prior art approach previously discussed.

In another embodiment, a wideband tuner arrangement may be advantageously utilized. One such wideband tuner arrangement contemplated is of the type described in co-owned and co-pending U.S. patent application Ser. No. 11/013,671 entitled "METHOD AND APPARATUS FOR WIDEBAND DISTRIBUTION OF CONTENT" previously incorporated herein. Specifically, the foregoing disclosure provides a mechanism for allowing for the creation and transmission of transport multiplexes that comprise a larger number of programs, thereby improving the opportunity to efficiently group the programs for transmission over network. Under this embodiment, the CPE 106 contains a wide-band tuner that allows it to receive the signals from several QAMs simultaneously (i.e., "multiple QAMs/multiple streams per QAM" approach, in contrast to the "one QAM/multiple streams" approach previously described). As in the system described above, the carriers are demodulated, and demultiplexed. The resulting several SPTS streams are then delivered to the resource manager 226 which maintains a content routing table for all of the streams provided via the wideband tuner arrangement, and directs their distribution.

In another embodiment, the apparatus and methods described in co-owned U.S. patent application Ser. No. 11/592,054 filed Nov. 1, 2006, entitled "METHODS AND APPARATUS FOR PREMISES CONTENT DISTRIBUTION", and issued as U.S. Pat. No. 8,732,854 on May 20, 2014, incorporated herein by reference in its entirety, may be used in conjunction with the CPE 106 of the foregoing embodiments to, inter alia, enforce security or other content-related policies. Specifically, the foregoing disclosure provides a mechanism for devices connected to a premises network to exchange information, and ultimately share or transfer protected content (including for example audiovisual or multimedia content, applications or data) in a substantially "peer-to-peer" fashion and without resort to a central security server or other such entity. Authorized "browsing" of the content present on one device by another device is also provided. In one exemplary embodiment, an application-level message exchange functionality allows the premises devices to advertise their security capabilities relating to, e.g., protected content, and query other devices for their security capabilities. This query can be performed, for example, by identifying security frameworks or security packages that a device is capable of handling. These frameworks or packages become critical in, inter alia, a heterogeneous security environment. For example, implementations of security frameworks from different vendors can be markedly different, and may or may not interoperate, such as where two different vendors use the same scrambling algorithms (e.g., Data Encryption Standard (DES), triple DES, AES, etc.) that cannot interoperate because the details of their key management are different.

Accordingly, the security architecture residing on two or more different client devices or domains can be reconciled and security information (and ultimately protected content) exchanged without resort to a centralized facility such as a cable headend process or entity. For example, in one embodiment, a "server" CPE (such as that containing the resource manager 226 previously described with respect to FIGS. 2b-2c) and a "renderer" CPE (e.g., a DSTB or DVR) are disposed within a premises network. Message exchanges between the "sever" and "renderer" identify and validate each entity and its security package or framework capabilities, as well as other capabilities that may be necessary to effect the exchange and use of the protected content, data or application (e.g., the presence of an appropriate codec, algorithm, network interface, etc.). These exchanges are all effectively automatic and transparent to the user, thereby making device location and identification, content/data/application exchange, and browsing seamless. They can also be used to enforce delivery restrictions/policies by the resource manager 226.

The CPE 106 can also provide a trusted or authorized service domain (ASD) for content or data, as well as allowing a subscriber total mobility in the home by not limiting content or data to any one viewing/access location. Exemplary methods and apparatus for establishing a downloadable conditional access (DCAS), DRM, or TD environment within a device or domain of a content-based network are described in co-owned U.S. patent application Ser. No. 11/584,208 filed Oct. 20, 2006 entitled "DOWNLOADABLE SECURITY AND PROTECTION METHODS AND APPARATUS", issued as U.S. Pat. No. 8,520,850 on Aug. 27, 2013, incorporated herein by reference in its entirety. Exemplary trusted domain apparatus and methods are described in co-owned and co-pending U.S. patent application Ser. No. 11/006,404 filed Dec. 7, 2004, entitled "TECHNIQUE FOR SECURELY COMMUNICATING PROGRAMMING CONTENT", issued as U.S. Pat. No. 8,312,267 on Nov. 13, 2012, incorporated herein by reference in its entirety, although it will be recognized that other approaches may be used.

In yet another embodiment of the invention, the CPE 106 may be utilized to act as a "personal" or local content server, whereby content may be stored locally within the premises network. In one such embodiment, the CPE 106 is equipped with DVR or comparable storage capability, and acts as the PCS for the local network. For instance, rather than delivery of the various SPTSs to different devices as shown in FIGS. 2b-2c, the received and processed streams may be stored within a mass storage device of the CPE in encrypted or unencrypted form as desired, to be requested and served to a connected local device at a later time.

In another embodiment, the CPE 106 acts as the local PCS, acting as a communications proxy/controller for a connected DVR-capable device.

In other embodiments of the present invention, mechanisms for allowing access to content (e.g., program viewing) delivery over other networks or communication channels outside of the parent content-based network may be used, such as those described in co-owned and co-pending U.S. patent application Ser. No. 11/440,490 filed May 24, 2006 entitled "PERSONAL CONTENT SERVER APPARATUS AND METHODS", and issued as U.S. Pat. No. 8,280,982 on Oct. 2, 2012, incorporated herein by reference in its entirety. For example, in the context of a cable television network, programming or other content delivered to a subscriber over the cable network can be accessed via other (secondary) networks such as the Internet, LANs/WANs/MANs, a wireless service provider (WSP) network, cellular service provider (CSP) network, or even a satellite network. The mobile or other devices can be fitted with, e.g., a client or distributed portion of the resource manager 226, the former and latter communicating with one another over an interposed network (e.g., Internet) in order to facilitate the resource manager functions previously described (such as routing of MPTS content to the remote device).

This network entity might comprise for example a head-end or hub server, or even a third party (e.g., web server). The type of information that can be sent includes "look-ahead" bit rate profile data (such as the instantaneous bit rate profile for an upcoming portion of a program stream); see, e.g., co-owned U.S. patent application Ser. No. 11/881,009 entitled "GENERATION, DISTRIBUTION AND USE OF CONTENT METADATA IN A NETWORK" filed Jul. 24, 2007, issued as U.S. Pat. No. 8,625,697 on Jan. 7, 2014, and incorporated herein by reference in its entirety. Other types of data can also be included, such as metadata that is descriptive of certain aspects of the content or its source (see, e.g., co-owned U.S. Provisional Patent Application Ser. No. 60/995,655 entitled "METHODS AND APPARATUS FOR USER-BASED TARGETED CONTENT DELIVERY" filed Sep. 26, 2007 and incorporated herein by reference in its entirety), information regarding advertising or promotional opportunities within the content, timing information, links to other sources of information (e.g., hyperlinks), and so forth.

Alternatively or additionally, future projections for instantaneous or other bandwidth requirements (as opposed to look-ahead processing of the program streams as described in the preceding paragraph) can be generated, such as those based on historical or anecdotal data. See, e.g., co-owned U.S. patent application Ser. No. 11/800,093 entitled "METHODS AND APPARATUS FOR PREDICTIVE CAPACITY ALLOCATION" filed May 4, 2007, issued as U.S. Pat. No. 9,398,346 on Jul. 19, 2016, which is incorporated herein by reference in its entirety, for exemplary mechanisms and methods by which such historically- or anecdotally-based predictions may be provided.

The foregoing data may be distributed by the resource manager 226 along with the content with which it is associated, or alternatively used by the resource manager or another higher-level process within the CPE, in order to achieve one or more operational or business goals. For example, in one variant, the aforementioned look-ahead bitrate data is used by the resource manager 226 to dynamically allocate resources within the CPE 106 or other connected devices. Alternatively, data relating to advertising or promotional opportunities within the various content streams could be used by the resource manager 226 to locally insert advertisements or promotions selected "on the fly" into the relevant program stream(s), or otherwise be displayed on a connected display device (such as via a locally generated window or interactive menu).

In another embodiment, the CPE 106 comprises a converged premises device (CPD), such as for example that described in co-owned U.S. patent application Ser. No. 11/378,129 filed Mar. 16, 2006, entitled "METHODS AND APPARATUS FOR CENTRALIZED CONTENT AND DATA DELIVERY", and issued as U.S. Pat. No. 8,347,341 on Jan. 1, 2013, incorporated herein by reference in its entirety. For example, this converged device may include the aforementioned resource manager functionality running on the processor thereof. The converged device is remotely manageable and acts as a centralized client networking platform providing gateway services such as network management as well as traditional content and high-speed data delivery functions. The device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. The resource manager of the present invention can therefore be used to control and allocate tuning resources not only associated with the CPE 106 itself, but also other devices within or in communication with the premises network, such as an OOB tuner on a connected DVR.

On the network side, the instantaneous or predictive bitrate data may also be used by the headend or another network process in order to decide which programs to multiplex onto a given multi-program transport (e.g., QAM). For example, it may be determined after examining the instantaneous bitrate profiles for several candidate pool programs that certain individual programs are better muxed together as opposed to other possible combinations (e.g., perhaps it is most bandwidth efficient to mux each of those programs with the highest variability in instantaneous bitrate as a function of time onto separate QAMs (i.e., with other programs streams with much lower instantaneous variability), thereby reducing the statistical likelihood that large swings in bandwidth will occur on any QAM, such as might occur when multiple programs with high variability are combined on the same transport.

Software Architecture—

In one embodiment, the resource manager 226 comprises a substantially stand-alone software process or computer program stored in the program memory of the CPE microprocessor (e.g., main processor 244 shown in FIG. 2c) or other storage device such as a hard disk drive (HDD), and adapted to run on the processor of the CPE 106, although other approaches (even to include firmware and/or hardware) may be used in conjunction with or in place of the aforementioned software process.

Optionally, dynamic updates to the resource manager application 226 can be made over the network, such as by download and installation of the new update (and destruction of the old application) at CPE startup or shutdown, etc. Moreover, in another embodiment of the invention, the resource manager may be configured to allow dynamic updates to its processing policies; e.g., to alter delivery routes for certain program streams, change how they are handled or processed, change CPE internal resource (e.g., tuner) allocation policies, and so forth. Stated differently, the resource manager provides the MSO with a "point of presence" type capability by which new policies, operational or business rules, etc. can be dynamically applied to individual CPE within the network, including in response to subscriber or user inputs or configuration change requests.

In another embodiment (see FIG. 2d), the resource manager functions are embodied in a distributed application (DA) of the type well known in the software arts, wherein the aforementioned functionality is distributed across two or more platforms; e.g., the CPE process 226 and a headend or hub-based process 270 in communication with the CPE process. Similarly, connected devices 274 within the premises (such as for example a connected DVR or the like) may employ a client module 280 or process that communicates with the CPE process (server) 226, the latter which serves content obtained from the MPTS to the various devices 274 based on requests from the client portion(s) 280. This latter client/server approach is somewhat distinct from the guide application implementation discussed elsewhere herein (see, e.g., FIG. 4); i.e., the guide application running on the CPE 106 along with the resource manager.

Methods—

Figure 3A:
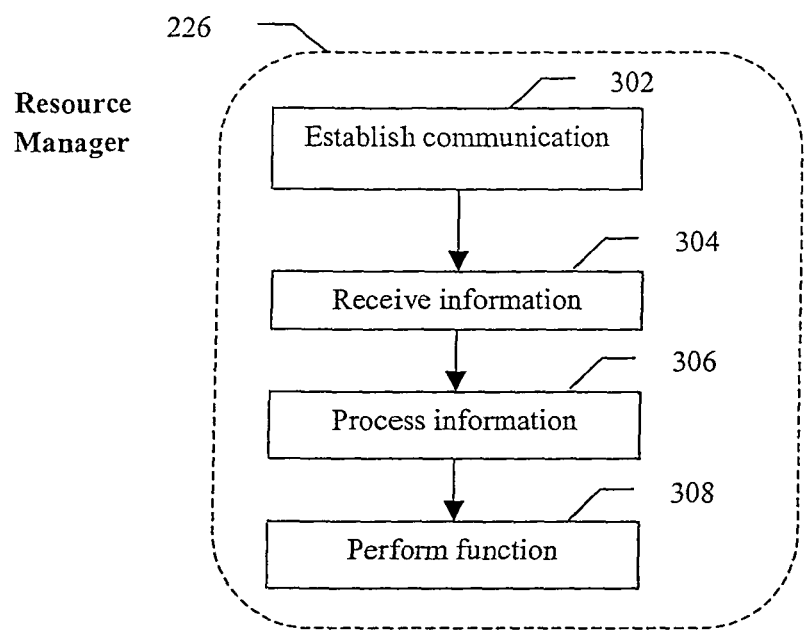
FIG. 3a is a logical flow diagram illustrating one embodiment of the generalized method of managing a plurality of tuner resources in a CPE according to the invention.

Referring now to FIG. 3a, one exemplary embodiment of the generalized method by which a premises device utilizes a resource manager 226 to manage a plurality of tuner resources is described.

As illustrated in FIG. 3a, when the resource manager 226 is powered up, it establishes the necessary communication with one or more system entities per step 302. Specifically, in the illustrated embodiment, the resource manager 226 optionally establishes a connection with a network entity (such as a headend or hub supervisory or other network process), as well as with the tuner resources within the CPE.

Once the resource manager 226 has established the necessary communication channels, it begins receiving information from the network entity and/or the tuner resources as applicable (step 304). The information which the resource manager 226 receives may include for example: (i) in-band information and/or out-of-band information from the network (e.g., the aforementioned headend or hub process), and (ii) status information from the tuner resources. The resource manager 226 processes the received information as per step 306. Note that the information may be received in a periodic, substantially continuous or streaming fashion and process as it is received, or alternatively all relevant information can be received an then processed.

As a result of the processing step (step 306); i.e., information produced or made available thereby, the resource manager 226 performs some function (step 308). This may include any number of different functions such as e.g., distributing received out-of-band information to other processes within the CPE or connected devices, or control the tuner resources based on the information.

Figure 3B:
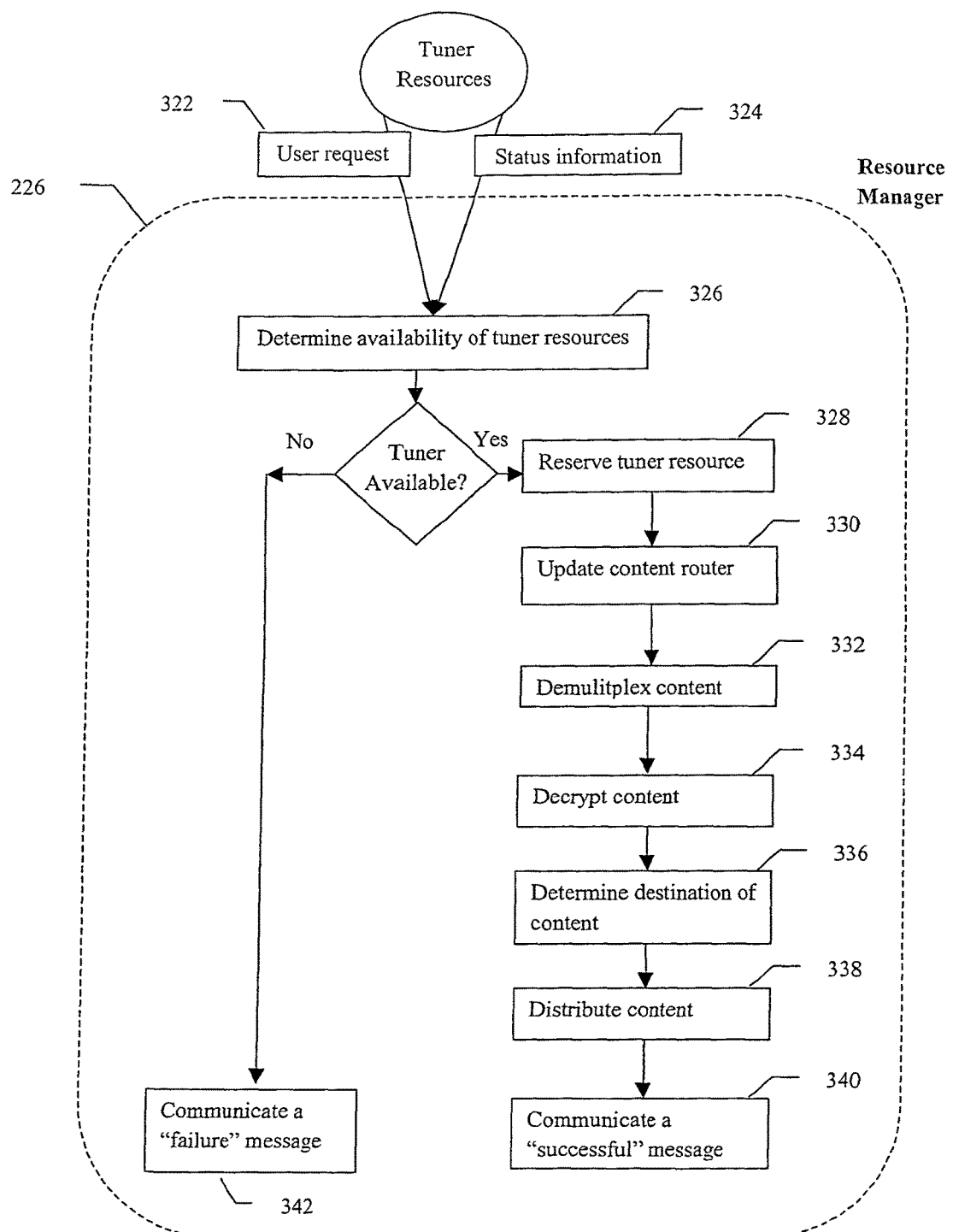
FIG. 3b is a logical flow diagram illustrating one exemplary implementation of the method of FIG. 3a, adapted for use with in-band tuning resources of the CPE of FIG. 2c.

FIG. 3b is a logical flow diagram illustrating an exemplary embodiment of the method by which a premises device, according to the invention, utilizes a resource manager 226 to manage the tuners of a multiplicity of devices. As illustrated in FIG. 3a, when the resource manager 226 is powered up, it initializes the tuner resources beginning communication between them. When a particular tuner resource receives a user request, for example a request for a particular program or channel, the tuner will communicate the request to the resource manager 226 per step 322. The tuner resources will also communicate, and the resource manager 226 will receive, current status information per step 324.

In step 326, the resource manager 226 utilizes the status information from the tuner resources to assist in a determination of the availability of each tuner resource. If no tuner resource is available, the application will yield a "failure" message (step 342). However, if a tuner resource is found to be available, the resource manager 226 will reserve that tuner resource (step 328). This reservation or selection process may also be subject to various logic, analyses or routines, such as for example an algorithm by which the most appropriate one of a plurality of resources is selected first, next-most appropriate selected second, and so forth. Similarly, certain types of applications or requested operations may need to be evaluated from a business or operation standpoint; e.g., such as where the pending request is put in a queue behind a higher-priority request (the higher priority quest being earlier, of greater potential profit to the MSO, or any number of other possible criteria for prioritization).

Per step 330, the resource manager 226 updates the content router associated with the reserved tuner resource, such as by adding the requested SPTS to the content route table. The resource manager 226 next causes the demultiplexer 224 to demultiplex the content of the requested QAM stream or streams (step 332). The resource manager also, in step 336, causes the content to be decrypted. In step 338, the resource manager determines the destination of the demultiplexed, decrypted content. Lastly, the resource manager will yield a "successful" ACK or other such message (step 340).

Figure 3C:
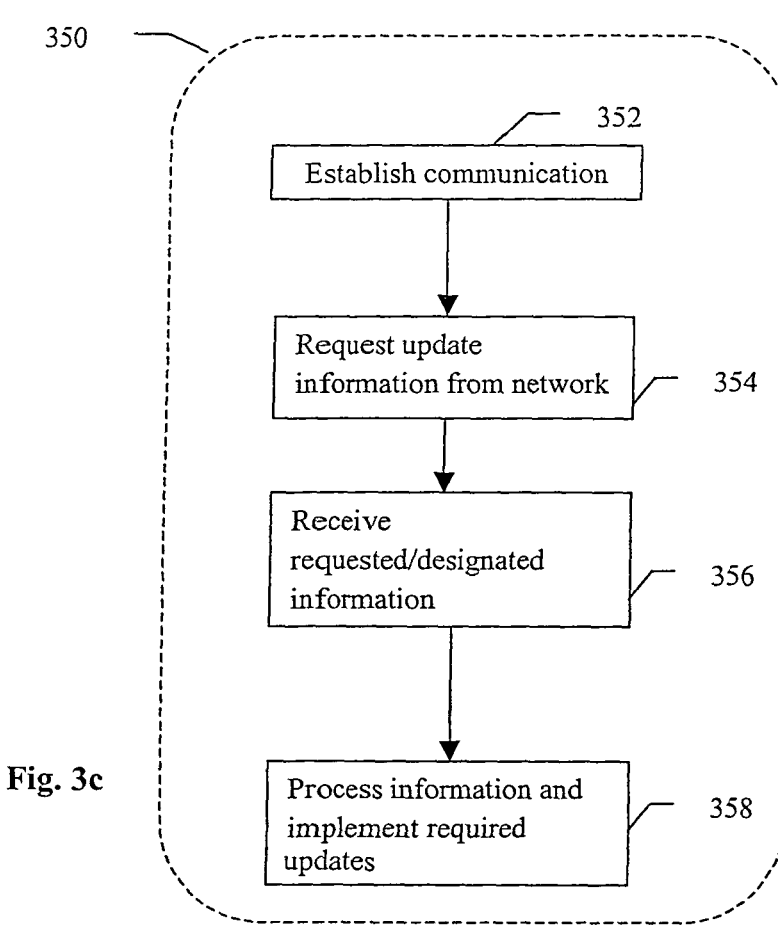
FIG. 3c is a logical flow diagram illustrating one embodiment of the method of provisioning the resource manager of the CPE of FIG. 2c.

FIG. 3c illustrates one exemplary embodiment of the network update process for the resource manager 226. The process 350 comprises first establishing communication between the resource manager 226 and the relevant network entity (e.g., headend server or control process, such as a portion of a distributed application (DA) as previously described) per step 352. This communication may be established via an OOB channel, an in-band/DOCSIS channel, or an external network channel (e.g., ISP or LAN/Intranet channel), etc.

Next, per step 354, the resource manager of the CPE 106 requests certain information (e.g., software or policy/rule updates) from the network entity. This may take the form of a request by the CPE for specific information, or alternatively may be as simple as an upstream message indicating that the communication channel is open and the resource manager active and enabled to receive downstream communications (irrespective of their nature or content).

Alternatively, in another embodiment (not shown), the provision of information is driven by the network entity; i.e., by establishing control over the resource manager 226 and causing it to receive and utilize the designated information (e.g., update the resource manager software). See, e.g., co-owned and co-pending U.S. patent application Ser. No. 11/607,663 entitled "METHODS AND APPARATUS FOR SOFTWARE PROVISIONING OF A NETWORK DEVICE" filed Dec. 1, 2006, incorporated herein by reference in its entirety, which describes exemplary methods and apparatus for software provisioning (e.g., installation/update) of a CPE within a network.

Per step 356, the requested (or designated) information is received at the CPE 106 over the established communication channel. The information is then processed (step 358), and the required actions implemented by the CPE 106. For example, the required action might be for the CPE to reinstall an application at next startup (or initiate a install/shutdown/reboot sequence), or replace a policies file within the resource manager application. Another action might comprise performing a resources (e.g., tuner) diagnostics routine, wherein the tuners, demodulators, etc. are tested and/or calibrated. Yet another action might comprise changing PID filter settings so as to change the filtering or masking of certain program streams. Myriad other actions or directives that can be implemented by the CPE resource manager will be recognized by those of ordinary skill given the present disclosure.

It should be noted that the above embodiments are merely exemplary; many other combinations and permutations of these methods may be realized in accordance with the present invention.

Tuner Algorithm—

FIG. 4 illustrates one exemplary embodiment of the tuning "efficiency" algorithm according to the present invention. This algorithm is used to, inter alia, determine whether a tuner resource is available, and then control the use of that resource. In the illustrated embodiment, the functionality of the tuning algorithm is assigned to the resource manager 226, rather than the OCAP or proprietary vendor architectures as in the prior art as previously discussed, although this is not a requirement.

As discussed above, the resource manager 226 initializes the tuner resources at power up. The relevant requesting application (e.g., electronic program guide or EPG application) sends a Channel Request or similar communication to the resource manager 226 (step 402). The resource manager 226 scans the tuner resources in order to determine whether at least one of the tuner resources was previously tuned to the requested frequency or QAM.

Per step 404, if the resource manager 226 determines that a tuner resource is already tuned to the desired frequency or QAM, the resource manager 226 updates the content router so that the requested stream is added to the content route table. As previously noted, the present invention advantageously permits the addition of more than one SPTS stream from a given QAM to be added to the content route table.

The MPEG 2 Program Identifier (PID) filter is then updated so that the requested SPTS is permitted to pass through the system (step 410), and the tuner resource information updated per step 412 to reflect the new route and new program stream to the system. Then, as per step 414, a "channel request successful" message is returned to the application indicating that the program is available to be sent to a receiving apparatus 228.

If no tuner resource is tuned to the desired frequency or QAM (step 406) the resource manager 226 determines whether at least one tuner resource is unassigned to another service in the content router and therefore available. If at least one tuner is unassigned, the resource manager 226, according to step 408, reserves the unassigned tuner resource and then, as above, updates the content router and returns a channel successful message to the application (step 414).

If there are no unassigned tuner resources, (i.e., all tuner resources are already being used) the resource manager 226 will search for other resources that may be available (step 416). If the resource manager 226 determines that a tuner resource is available, according to step 418, it will begin the process of preparing that tuner to be tuned beginning with step 402 above.

If the resource manager 226 fails to find a tuning resource, the resource manager 226 or a proxy thereof may contact remote resource managers to find an available resource (step 422). If the resource manager 226 determines that a remote resource is available per step 424, the resource manager 226 reserves that resource with the remote resource manager (step 426). The resource manager 226 then updates the content router to route the information from that interface to the proper location.

If the resource manager 226 cannot find a remote tuner resource, it returns a "channel request failure" message to the application per step 420.

Business Models—

In another aspect of the invention, the aforementioned apparatus and methods can be used as the basis for one or more business models or methods.

As previously discussed, various embodiments of the invention advantageously reduce capital costs associated with CPE 106 and infrastructure by inter alia, utilizing the full content stream available on one or more QAMs.

In one embodiment of the business method, the network operator (e.g., MSO) distributes multi-stream enabled CPE 106 of the type previously described herein to all or a selected subset of network subscribers. This distribution can be accomplished at new subscriber sign-up, as part of a periodic or one-time upgrade, upon change in service or subscription level, etc. One variant of the method comprises retrofitting existing devices with the aforementioned capability, such as by swapping the subscriber's existing device with an upgraded version, the existing device being sent back to the factory or another facility for retrofit (or simply discarded and replaced with a newly manufactured model).

The upgraded capability device 106 may be distributed to subscribers for a fee (somewhat akin to an HD receiver), as part of a promotion, as part of an upgraded subscription package, and so forth. Moreover, individual features such as multi-tuner "PIP" (i.e., with only one tuner), ability to distribute to other premises devices via the CPE 106 back-end interfaces, etc. or other functions can be parsed out or combined with other features or incentives as desired by the network operator.

When the multi-stream enabled device 106 is installed, it then communicates with the network 101 to obtain PID, program mapping, and/or other relevant information as previously described herein. This communication may be via an in-band channel, out-of-band channel, DOCSIS, or even a channel not served the HFC infrastructure (e.g., third party Internet service provider, wireless channel, etc.). The MSO may also configure the CPE 106 to selectively provide the aforementioned multi-stream services, such as based on commands or messages received from the headend to enable or disable the requisite functionality (e.g., during promotions, emergencies, etc.).

In yet another embodiment, the CPE 106 can be used to host or receive service or other such applications. For example, an application with a particular service or maintenance functionality can be downloaded to the CPE (or a designated proxy device, such as the aforementioned PC) and run as needed to provide the necessary functions. This application can then stay resident (dormant) on the CPE 106 or PC, be destroyed upon completion of its function, and so forth. The application might be used for example to collect polling or sample data from one or more devices within the premises network, monitor CPE 106 functions, initiate communications with other devices (e.g., as a local communications proxy according to a prescribed communications or data transfer protocol), etc.

Similarly, the CPE 106 or a designated proxy thereof can be used as a "Point of Presence" (PoP) for the network operator; e.g., a chat, text, audio, etc. interactive user interface, which allows for real-time interactive communication between the operator (e.g., MSO) and the user. Such functionality may be useful, for example, where the user requires "on line" or real time help with finding or activating a service, troubleshooting, subscription package changes, movie downloads, and the like.

The use of an application-agnostic resource manager architecture as in the illustrated embodiments also advantageously allows for the application (software) developer to write applications for that CPE that do not require a tuner discovery and control module as in the prior art approaches previously discussed. Moreover, the developed application can more readily be made compliant with a given standard or protocol (e.g., OCAP), since with no tuner discovery/control functionality, compliance is more easily attained. Moreover, the developed applications, by virtue of not being necessarily inherently tied to a particular architecture (e.g., OCAP), although they may be compliant with that architecture, can feasibly have broader applicability across multiple CPE types; i.e., having somewhat heterogeneous or different features, etc. These features accordingly reduce the cost of development of an application for use on the CPE 106 described herein, and potentially other heterogeneous CPE, since the application code development and certification are both simpler.

It will also be appreciated that the dynamic resource manager update and control capability (see, e.g., FIG. 2d and associated discussion) advantageously affords the opportunity for certain business models and policies to be implemented. For example, the dynamic update capability (especially when tied to user-supplied inputs or specifications) can be included as an incentive or a for-pay (value added) feature; subscribers may pay more for the ability to selectively and dynamically control how programs within a stream are filtered and/or routed, especially to connected devices. For instance, the ability to demultiplex, decode and decrypt multiple different content streams simultaneously and distribute them to a variety of device (e.g., mass storage, client media device, personal computer, etc.) within the subscriber's premises is a feature not currently offered by MSOs, and subscribers may be willing to pay extra for such capabilities, especially if they can readily adjust or change their desired distribution settings. Accordingly, in one aspect of the invention, the subscriber is presented with a substantially centralized user interface (e.g., GUI) that permits them to selectively control the distribution of programs that are received via the MPTS. For example, the aforementioned GUI may comprise an on-screen display window or menu generated by the CPE 106 or a connected device on a local display (e.g., monitor, or PC display).

Figure 5:
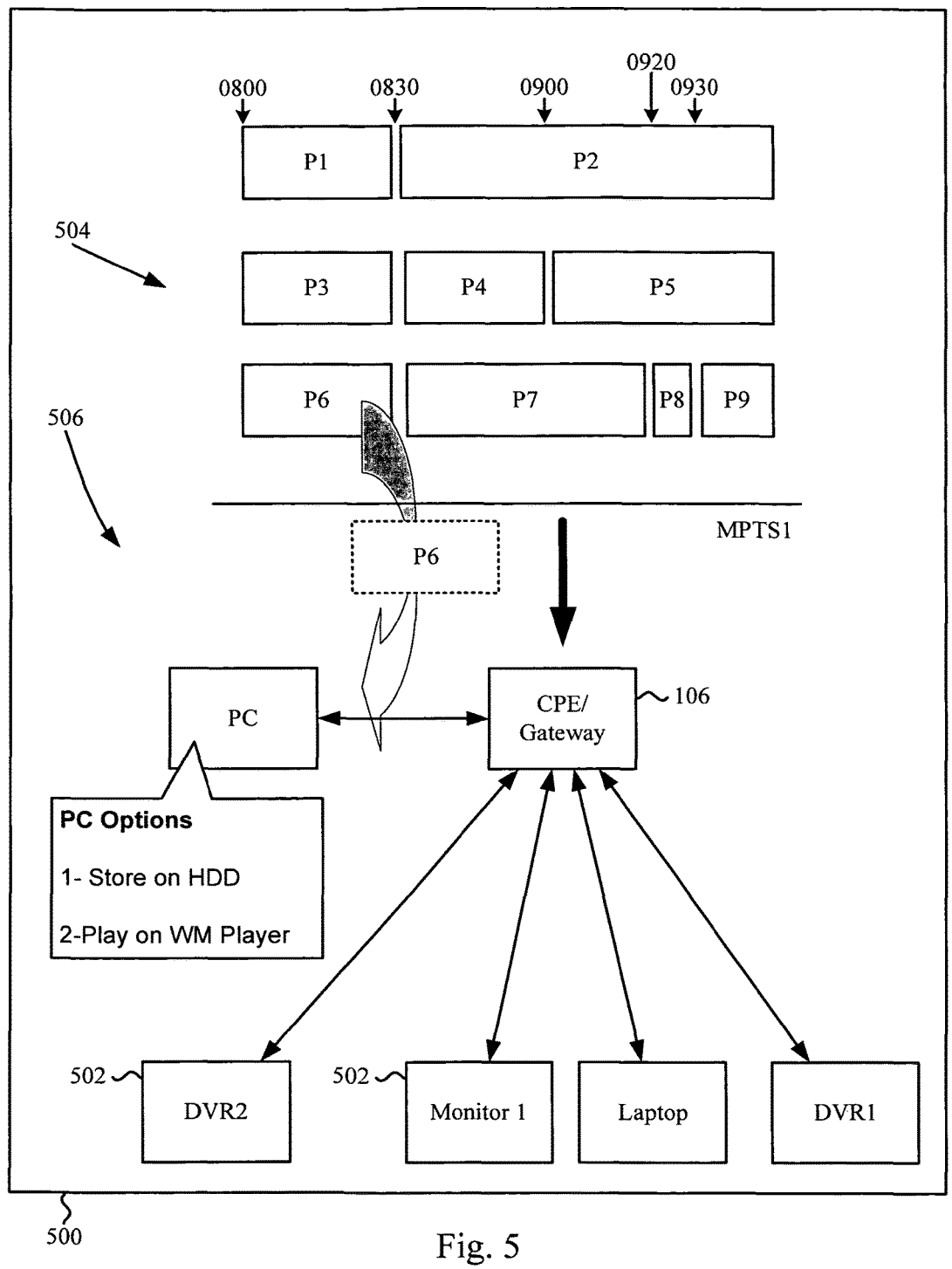
FIG. 5 is a graphical representation of one embodiment of an exemplary user interface useful with the resource management functionality of the present invention.

FIG. 5 shows one such exemplary GUI display useful with the present invention, whereby the various devices 502 within the premises network are iconically represented, and the received individual program streams displayed in a table 504 or other data display mechanism. In this embodiment, the display is generated on a PC that is in data communication with the CPE 106 (via, e.g., an Ethernet, MoCA, FireWire, WiFi, or other such interface). This display may be generated for example using a client application running on the PC that communicates with the resource manager 226, although other approaches (such as having the CPE 106 generate the display itself, etc.) may be used with equal success.

In the embodiment of FIG. 5, the user merely drags the desired program stream present in the table 504 to the desired icon (device) 502, thereby "associating" the program stream with this device for purposes of the routing table. The user can also specify the type of action to be taken for this association, such as by using a pulldown menu. Choices for the different devices may be different, and the client application is adapted to communicate with the various devices directly (or indirectly, via the resource manager 226) to ascertain which options are available for each device. For example, if the selected device is a DVR, the options available for a selected content stream may include "record to HDD" and "play out via monitor". Rollover text "bubbles" 506 or other such mechanisms can also be used for the icons to rapidly display to a user the available actions/capabilities for each device.

It will be appreciated that the table 504 can be structured akin to an EPG, such that the user can view current and future program streams available on an MPTS, and allocate them to devices 502 in advance. For instance, the user might specify to watch Program Stream A contemporaneously (i.e., as a broadcast or live stream), record Program Stream B for later viewing, and send Program Stream C to a PC or laptop within the premises network for viewing by another member of the family.

In another aspect, the present invention advantageously provides several opportunities for cost savings and reduced overhead by the network operator (e.g., MSO). Specifically, as one example, the ability to pull multiple streams off a single transport (potentially even using one tuner) allows for the provision of new services to existing subscribers without a service call or "truck roll." Instead of the MSO having to send a service representative to the premises with a new box, or mail a new box to the subscriber, the existing premises device with multiple transport capability can simply be remotely provisioned or configured to allow the designated new receiver device (e.g., PC) to receive the additional single transport pulled from the multiplex. This provides significant savings in cost to the (MSO and the subscriber ultimately), and increases subscriber satisfaction via reduced latency in providing service, less interruption of their life by having to wait for and accommodate a service technician, etc. It also allows for space savings on the premises, since a separate box is no longer required.

Moreover, it will be appreciated that by economizing tuning resources (and also the necessity to provide separate boxes, as previously discussed), significant electrical power savings can be realized. Simply stated, less devices that require electrical power consume, all else being equal, less electrical power. This is particularly important in those applications where electrical power is being provided over a service delivered to the premises by the MSO (versus say the local electric company), in that the MSO infrastructure will have less power burden for the same delivered content, and hence can either be smaller, run less often, etc. Similarly, the network infrastructure itself may accrue benefits from this approach, including less loading (current draw) for the same delivered service, thereby potentially increasing longevity of the infrastructure, reducing ohmic or $I^2R$ losses, etc., In another aspect, so-called "PIP" (picture-in-picture) or mosaic/tiled displays can be provided their input using only a single device; i.e., DSTB or converged premises device having multiple transport recovery capability. Much like prior art televisions having two built-in RF tuners to receive two different over-the-air broadcasts (channels) which could be displayed on the same CRT or LCD, the multi-transport capability of the present invention allows two or more independent streams to be fed to different display regions on the same display device (e.g., in side-by-side, overlapping, or other such fashion so that each is at least partly visible), or even different display devices.

One particularly useful implementation of such capability is for security or other multiple-location monitoring applications. For example, see the exemplary methods and apparatus for backhaul signal use described in co-owned and co-pending U.S. patent application Ser. No. 11/186,452 filed Jul. 20, 2005 entitled "Method and Apparatus for Boundary- Based Network Operation", which is incorporated herein by reference in its entirety. Specifically, the foregoing exemplary disclosure provides for "backhauls" to the local hub or other network node. For example, a business-class circuit backhaul to the local hub is envisioned, such as for "neighborhood camera" applications. In one exemplary embodiment, separate video feeds from one or more cameras (or other sensors) are generated and backhauled using the local content-based network distribution system. These cameras or sensors may be disposed in and utilized for any number of different functions, such as in a high-rise to monitor various areas for security, at the gates of a gated community, in an enterprise or business facility, such as to monitor various inventory storage locations or portions of the manufacturing line, by at government laboratories or military installations, etc. Specifically, this backhaul" approach of the present invention removes the downstream bandwidth limitations under prior art approaches; rather, the only effective limitations are in the upstream direction (since the video or other signals from the cameras/sensors are being backhauled to the local hub in the upstream direction). Signal replication of the type well known in the networking arts is used to efficiently make the backhauled content available immediately for transmission in the downstream direction. The upstream signals may be replicated on a node-by-node basis, and every node can have its own cameras/sensors if desired.

Furthermore, there is advantageously no requirement that the cameras or sensors be disposed on same physical topology. Specifically, the backhaul may be wireless, coax, fiber, DDAS (development dedicated access services), etc., or any mix thereof.

Hence, under one exemplary scenario, the backhauled signals are delivered to the hub and replicated, and then delivered (in the forward or downstream direction) to selective subscribers delivered to subscribers in a housing complex, etc., such as to be able to view the garage of the complex and monitor for theft. The signal can also be backhauled further inward toward the core, repeated (replicated), and then made available to multiple different hub servers, the latter being disposed closer to the edge of the network.

These services can form the basis of a business model within the aforementioned cable system, thereby providing an additional revenue stream obtained largely from under-utilized bandwidth already existing within the system by virtue of the broadcast switched architecture (BSA). This adds great flexibility to the network operator, and allows for generation of revenue from otherwise unutilized "upstream" bandwidth" that is already available in the extant network infrastructure.

In the context of the present invention, the provision of multiple backhauled signals (potentially from disparate geographic locations) can be received as part of a single or few multiplexed transports at a single CPE, and then demultiplexed and delivered to either the same display device, or multiple different devices. Hence, a single DSTB configured with a resource manager, etc. according to the present invention could demultiplex and deliver separate video feeds from multiple different locations to a single monitor, a group of monitors, separate recording devices, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A premises network resource management apparatus configured to manage a plurality of tuner resources within a plurality of premises devices, said resource management apparatus comprising:
   processing apparatus; and
   storage apparatus in data communication with said processing apparatus and comprising at least one computer program, said at least one program comprising a plurality of instructions which are configured to, when executed by said processing apparatus:
   receive a request for content from a first one of said plurality of premises devices;
   obtain information regarding said plurality of tuner resources of said plurality of premises devices;
   determine that no tuner resources of said first one of said plurality of premises devices are available to access said requested content based on said information regarding said plurality of tuner resources of said plurality of premises devices;
   in response to said determination that no tuner resources of said first one of said plurality of premises devices are available to access said requested content, identify, from among said plurality of tuner resources of said plurality of premises devices based on said information regarding said plurality of tuner resources, a tuner resource of a second one of said plurality of premises devices available to access said requested content;
   maintain a content routing table, said content routing table comprising information at least relating to a plurality of programs and respective routing thereof;
   update said content routing table to reflect routing of said requested content to said available tuner resource of said second one of said plurality of premises devices;
   cause said available tuner resource of said second one of said plurality of premises devices to tune to said requested content; and
   provide said requested content to said first one of said plurality of premises devices.

2. The resource management apparatus of claim 1, wherein said information comprises status information comprising at least one of:
   (i) a current frequency to which at least one of said plurality of tuner resources is currently tuned;
   (ii) programs that are available on said current frequency; or
   (iii) program identifications associated with said programs available on said current frequency.

3. The resource management apparatus of claim 1, wherein said causation of said available tuner resource of said second one of said plurality of premises devices to tune to said requested content, and said provision of said requested content to said first one of said plurality of premises devices comprise:
reservation of said available tuner resource of said second one of said plurality of premises devices; and
causation of said available tuner resource of said second one of said plurality of premises devices to distribute a first program stream comprising said requested content to said first one of said plurality of premises devices in accordance with said content routing table.

4. The resource management apparatus of claim 3, wherein said plurality of instructions are further configured to, when executed, direct said available tuner resource of said second one of said plurality of premises devices to distribute a second program stream different from said first program stream to a third one of said plurality of premises devices concurrently with said distribution of said first stream in accordance with said content routing table.

5. The resource management apparatus of claim 1, wherein said at least one computer program comprises an object-oriented computer program.

6. The resource management apparatus of claim 5, further comprising
an interface configured to communicate data or signals between said plurality of tuner resources and said processing apparatus.

7. The resource management apparatus of claim 6, wherein said plurality of tuner resources comprise a plurality of radio frequency (RF) tuners each configured to tune to and receive at least one quadrature amplitude modulated (QAM) signal.

8. The resource management apparatus of claim 7, further comprising at least one demodulator, said at least one demodulator configured to demodulate said at least one QAM signal;
wherein said at least one demodulator is in communication with said processing apparatus and is at least partly controllable thereby.

9. The resource management apparatus of claim 8, wherein said resource management apparatus is further configured to manage said plurality of tuner resources in accordance with a network operator-specified policy that is communicated to said resource management apparatus over a network.

10. The resource management apparatus of claim 1, wherein said resource management apparatus is configured to manage said tuner resources in accordance with a user-specified policy.

11. The resource management apparatus of claim 1, wherein said plurality of tuner resources comprise at least one out-of-band (OOB) tuner, and said resource management apparatus is configured to control said at least one OOB tuner for said transmission of said OOB communication signals to said headend device.

12. The resource management apparatus of claim 11, wherein said at least one OOB tuner is disposed on a second platform physically separate from a first platform of said resource management apparatus.

13. The resource management apparatus of claim 12, wherein said second platform comprises a digital video recorder, and said first platform comprises a set top box or receiver.

14. The resource management apparatus of claim 1, wherein said plurality of instructions are further configured to, when executed, analyze said content routing table to implement one or more rules.

15. The resource management apparatus of claim 14, wherein said one or more rules are utilized to identify particular content which can be selectively routed to only certain ones of said plurality of premises devices, and wherein said identification is based at least in part on a rating associated with said particular content.

16. The resource management apparatus of claim 14, wherein said one or more rules are utilized to identify, based on at least one prescribed condition associated with said first one of said plurality of premises devices, whether to decrypt said requested content, and wherein said at least one prescribed condition comprises a public/private key exchange.

17. An apparatus configured to manage a plurality of tuner resources of a plurality of client devices in a premises network, said apparatus comprising:
a first interface configured to receive, over said premises network, information regarding said plurality of tuner resources of said plurality of client devices, each of said tuner resources being associated with an individual one of said plurality of client devices;
a first tuner resource configured to receive at least one multiplexed transport stream from a content delivery network;
a demultiplexer configured to demultiplex a plurality of program streams from said at least one multiplexed transport stream; and
a processor apparatus configured to:
control distribution of said plurality of program streams to respective ones of said plurality of client devices in communication with said apparatus according to a security policy configured to identify, based on a security level associated with each of said ones of said plurality of client devices, whether to distribute said plurality of program streams to said respective ones of said client devices as decrypted program streams or encrypted program streams;
according to said identification, distribute encrypted program streams to first ones of said respective ones of said client devices, and distribute decrypted program streams to second ones of said respective ones of said client devices;
determine that said first tuner resource is unavailable to receive an additional multiplexed transport stream from said content delivery network;
in response to said determination that said first tuner resource is unavailable to receive said additional multiplexed transport stream, identifying a second tuner resource of a first one of said plurality of client devices available to receive said additional multiplexed transport stream based on said information regarding said plurality of tuner resources; and
control distribution of a plurality of program streams demultiplexed by said first one of said plurality of client devices from said additional multiplexed transport stream according to said security policy.

18. The apparatus of claim 17, wherein said first tuner resource comprises at least one radio frequency (RF) tuner.

19. The apparatus of claim 17, wherein said first tuner resource comprises at least one wideband tuner, said at least one wideband tuner configured to tune and receive a plurality of radio frequency (RF) channels simultaneously.

20. The apparatus of claim 17, wherein said demultiplexer further comprises an internal filter, said internal filter configured to facilitate selective identification and recovery of said plurality of program streams from said at least one multiplexed transport stream.

21. The apparatus of claim 20, wherein said internal filter comprises a program identification (PID) filter, and said selective identification and recovery are based at least in part on PIDs associated with each of said plurality of program streams.

22. The apparatus of claim 20, wherein:
said information comprises status information regarding said plurality of tuner resources; and
said processor apparatus is further configured to decrypt at least a portion of said plurality of streams.

23. A method of managing a plurality of tuner resources within a plurality of premises devices via a network resource manager, said method comprising:
receiving a request for content from a first one of said plurality of premises devices;
obtaining information regarding said plurality of tuner resources;
determining that no tuner resources of said first one of said plurality of premises devices are available to access said requested content based on said information regarding said plurality of tuner resources;
in response to determining that no tuner resources of said first one of said plurality of premises devices are available to access said requested content, reserving a tuner resource of another one of said plurality of premises devices for receiving said requested content;
determining a security level of said first one of said plurality of premises devices, said security level indicating whether said first one of plurality of premises devices is to receive said requested content as decrypted content or as encrypted content, said security level comprising a trusted domain formed between said network resource manager and said first one of said plurality of premises devices; and
distributing said requested content received at said tuner resource of said another one of said plurality of premises devices to said first one of said plurality of premises devices, said distribution thereof comprising a decrypted or an encrypted content stream based on said security level.

24. The method of claim 23, further comprising:
receiving a plurality of upstream out-of-band (OOB) communication signals from individual ones of said plurality of premises devices for transmission to a headend device;
receiving from said headend device a plurality of downstream OOB communication signals; and
transmitting said plurality of downstream OOB communication signals to respective ones of said individual ones of said plurality of premises devices based at least in part on an identifier contained therein.

25. The method of claim 23, wherein receiving information comprises receiving at least one of:
(i) a frequency to which at least one of said plurality of tuner resources is currently tuned;
(ii) programs that are available on said current frequency; or
(iii) program identifications associated with said programs available on said current frequency.

26. The method of claim 23, further comprising:
directing said reserved tuner resource of said another one of said plurality of premises devices to distribute a first program stream to said first one of said plurality of premises devices in accordance with a content routing table, said content routing table comprising information at least relating to a plurality of programs and respective routing thereof.

27. The method of claim 26, further comprising:
directing said reserved tuner resource of said another one of said plurality of premises devices to distribute a second program stream to said first one of said plurality of premises devices concurrently with distributing said first program stream.

28. The method of claim 23, wherein said plurality of tuner resources comprise a plurality of radio frequency (RF) tuners each configured to tune to and receive at least one quadrature amplitude modulated (QAM) signal.

29. The method of claim 28, further comprising demodulating said at least one QAM signal.

30. The method of claim 23, further comprising managing said plurality of tuner resources in accordance with a network operator-specified policy communicated to said network resource manager over a network.

31. The method of claim 23, further comprising managing said plurality of tuner resources in accordance with a user-specified policy.

32. A premises network resource management apparatus configured to manage a plurality of tuner resources within a plurality of premises devices, comprising:
processing apparatus; and
storage apparatus in data communication with said processing apparatus and comprising at least one computer program, said at least one program comprising a plurality of instruction which are configured to, when executed:
maintain a local content routing table, said content routing table comprising information at least relating to a plurality of programs and respective routing thereof;
receive a request for content from a first one of said plurality of premises devices;
obtain information regarding said plurality of tuner resources;
determine that no tuner resources of said first one of said plurality of premises devices are available to access said requested content based on said obtained information;
based at least on said determination and using at least a portion of said obtained information, identify a tuner resource of a second one of said plurality of premises devices available to access said requested content;
update said local content routing table to reflect routing of said requested content to said available tuner resource of said second one of said plurality of premises devices;
cause said available tuner resource of said second one of said plurality of premises devices to tune to said requested content; and
provide said requested content to said first one of said plurality of premises devices.

33. The premises network resource management apparatus of claim 32, wherein said plurality of instructions are further configured to, when executed, interface with one or more application programs associated with one or more of said plurality of premises devices, said one or more application programs having no tuner discovery or control functionality.

* * * * *